(12) United States Patent
Benedict et al.

(10) Patent No.: US 11,409,737 B2
(45) Date of Patent: Aug. 9, 2022

(54) INTERACTIVE STRUCTURED ANALYTIC SYSTEMS

(71) Applicant: Resilient Cognitive Solutions, LLC, Pittsburgh, PA (US)

(72) Inventors: Joel P. Benedict, Aliquippa, PA (US); Caroline E. Christ, Pittsburgh, PA (US); Paul E. Durbin, Ellwood City, PA (US); William C. Elm, Pittsburgh, PA (US); Kathryn M. Kopren, Pittsburgh, PA (US); Brian Mendicino, Fair Oaks, PA (US); Brian A. Neal, Pittsburgh, PA (US); Samantha S. Szymczak, Pittsburgh, PA (US); Mark Westerlund, Pittsburgh, PA (US); Jorge E. Zuniga, Chicago, IL (US); Elise M. Reeves, Pittsburgh, PA (US)

(73) Assignee: RESILIENT COGNITIVE SOLUTIONS, LLC, Pittsburgh, PA (US)

( * ) Notice: Subject to any disclaimer, the term of this patent is extended or adjusted under 35 U.S.C. 154(b) by 878 days.

(21) Appl. No.: 16/204,872

(22) Filed: Nov. 29, 2018

(65) Prior Publication Data
US 2019/0163681 A1 May 30, 2019

Related U.S. Application Data

(60) Provisional application No. 62/592,213, filed on Nov. 29, 2017.

(51) Int. Cl.
*G06F 16/24* (2019.01)
*G06F 16/2452* (2019.01)
(Continued)

(52) U.S. Cl.
CPC ...... *G06F 16/24522* (2019.01); *G06F 16/243* (2019.01); *G06F 16/248* (2019.01);
(Continued)

(58) Field of Classification Search
CPC ............... G06F 16/2452; G06F 16/242; G06F 16/2457; G06F 16/248; G06F 16/332; G06F 16/24
See application file for complete search history.

(56) References Cited

U.S. PATENT DOCUMENTS 9,058,354 B2 6/2015 Dolan
9,251,461 B2 2/2016 Abdul et al.
(Continued)

*Primary Examiner* — Aleksandr Kerzhner
*Assistant Examiner* — Maher N Algibhah
(74) *Attorney, Agent, or Firm* — King & Spalding LLP

(57) ABSTRACT

An analytics system can include a display on which a plurality of images are shown, and an analytics application communicably coupled to the display. The analytics application can receive a question and hypotheses from a user using the display. The analytics application can also generate queries using a natural language module, and send the queries to a plurality of data sources. The analytics application can further receive data from the data sources in response to the queries, and evaluate the data to generate evaluated data. The analytics application can also present the evaluated data, and receive a selection of at least one data item of the evaluated data. The analytics application can further convert the at least one data item into evidence, receive a selection of the evidence applied to a hypothesis, and evaluate the hypothesis. The analytics application can also present an assessment that the hypothesis answers the question.

20 Claims, 23 Drawing Sheets

(51) Int. Cl.
*G06F 16/2457* (2019.01)
*G06F 16/248* (2019.01)
*G06F 16/242* (2019.01)
*G06F 16/332* (2019.01)
*G06Q 10/06* (2012.01)
*G06Q 10/10* (2012.01)

(52) U.S. Cl.
CPC .... *G06F 16/24578* (2019.01); *G06F 16/3329* (2019.01); *G06Q 10/06* (2013.01); *G06Q 10/0637* (2013.01); *G06Q 10/10* (2013.01)

(56) References Cited

U.S. PATENT DOCUMENTS

| | | | |
|---|---|---|---|
| 2012/0301864 A1* | 11/2012 | Bagchi | A61B 5/00 434/362 |
| 2013/0006649 A1 | 1/2013 | Rangadass et al. | |
| 2013/0035961 A1* | 2/2013 | Yegnanarayanan | G16H 10/60 705/3 |
| 2014/0297571 A1* | 10/2014 | Beamon | G06F 16/313 706/12 |
| 2016/0180726 A1* | 6/2016 | Ahuja | G06N 5/022 434/322 |
| 2017/0024659 A1* | 1/2017 | Stromsten | G06F 16/24578 |

\* cited by examiner

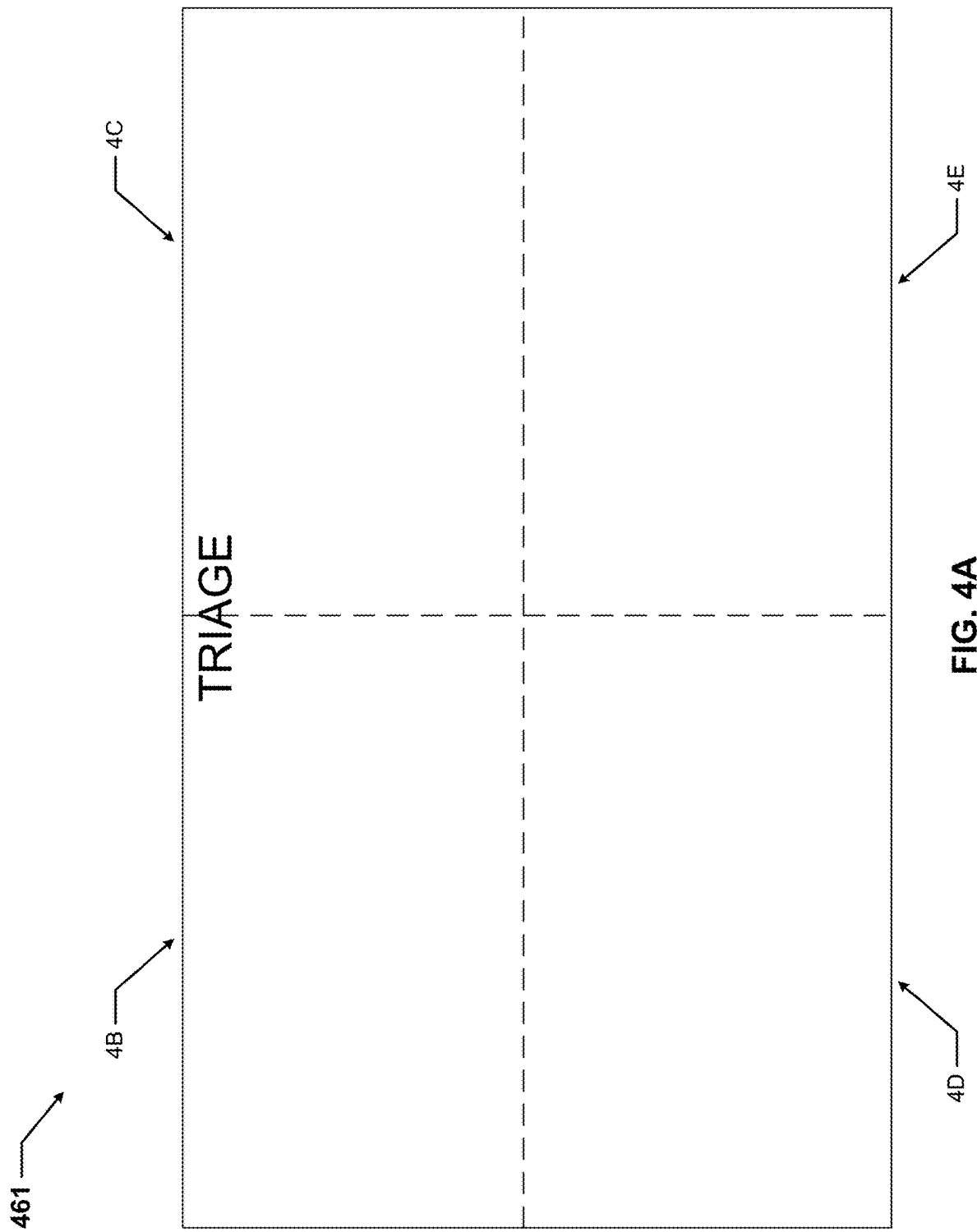

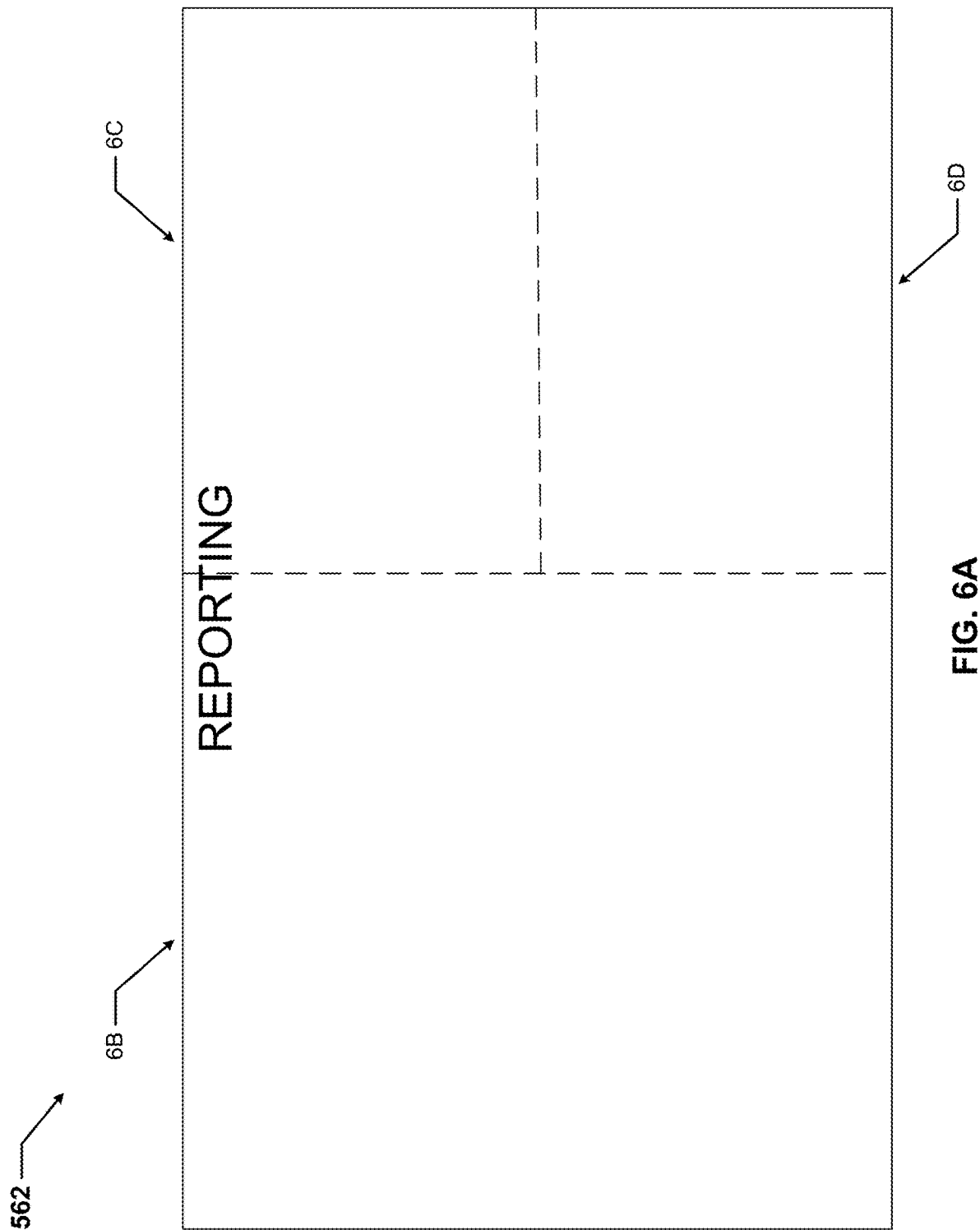

INTERACTIVE STRUCTURED ANALYTIC SYSTEMS

CROSS REFERENCE TO RELATED APPLICATIONS

This application claims priority under 35 U.S.C. § 119 to U.S. Provisional Patent Application Ser. No. 62/592,213, titled "Interactive Structured Analytic Systems" and filed on Nov. 29, 2017, the entire contents of which are hereby incorporated by reference in their entirety.

TECHNICAL FIELD

The present disclosure relates generally to analytic tools, and more particularly to systems, methods, and devices for interactive structured analytic systems.

BACKGROUND

In a wide variety of fields (e.g., security, medical treatment, capital investment), queries and hypotheses are often presented for analysis and resolution. In many cases, an overwhelming amount of data is available for consideration in these analyses. Systems used in these instances often employ filters in an attempt to remove irrelevant data so that only relevant data is considered. In many cases, however, these filters tend to remove some amount of relevant data, and so this relevant data is not used in the analysis. These filters can also exacerbate any biases that may exist in an analysis. As a result, the conclusions drawn using such systems can be erroneous or less than optimal. Depending on the field involved, these errors or reduced level of optimization can lead to catastrophic results.

SUMMARY

In general, in one aspect, the disclosure relates to an analytics system that includes a display on which multiple images are shown. The analytics system can also include an analytics application communicably coupled to the display. The analytics system can receive a question from a user using the display, where the question is selected from among a network of questions. The analytics system can also receive assumptions and hypotheses from the user using the display. The analytics system can further generate, by a query module, multiple queries using a natural language module, where the natural language module incorporates natural language into the queries, where the queries are based on the question, the assumptions, and the hypotheses. The analytics system can also send the queries to multiple data sources. The analytics system can further receive data from the data sources in response to the queries. The analytics system can also evaluate the data to generate evaluated data. The analytics system can further present, to the user using a triage module on the display, the evaluated data. The analytics system can also receive, from the user by the triage module on the display, a first selection of at least one data item of the evaluated data. The analytics system can further convert, by the triage module, the at least one data item into evidence. The analytics system can also receive a second selection of the evidence applied to a hypothesis among the hypotheses. The analytics system can further evaluate, by an assessment module, the hypothesis against the question. The analytics system can further present, by the assessment module on the display, an assessment of the hypothesis against the question based on an analysis by a hypotheses manager. The analytics system can further receive, from the user on the display, confirmation that the hypothesis answers the question.

In general, in another aspect, the disclosure relates to a system for solving a problem by offsetting cognitive bias. The system can include multiple data sources and at least one user. The system can also include a display and an analytics application communicably coupled to the data sources and the at least one user. The analytics application can receive a question from the at least one user using the display, where the question is among a network of questions. The analytics application can also receive hypotheses from the at least one user using the display. The analytics application can further generate, by a query module, multiple queries using a natural language module, where the natural language module incorporates natural language into the queries, where the queries are based on the question and the hypotheses. The analytics application can also send the queries to the data sources. The analytics application can further receive data from the data sources in response to the queries. The analytics application can also evaluate the data to generate evaluated data. The analytics application can further present, to the at least one user using a triage module on the display, the evaluated data. The analytics application can also receive, from the at least one user by the triage module on the display, a first selection of at least one data item of the evaluated data. The analytics application can further convert, by the triage module, the at least one data item into evidence. The analytics application can also receive a second selection of the evidence applied to a hypothesis among the hypotheses. The analytics application can further evaluate, by an assessment module, the hypothesis against the question. The analytics application can also present, by the assessment module on the display, an assessment of the hypothesis against the question based on an analysis by a hypotheses manager. The analytics application can further receive, from the at least one user on the display, confirmation that the hypothesis answers the question.

In general, in yet aspect, the disclosure relates to a non-transitory computer-readable medium comprising instructions that, when executed by a hardware processor, perform a method for solving a problem. The method can include receiving a question from a user using a display, where the question is among a network of questions. The method can also include receiving hypotheses from the user using the display. The method can further include generating, by a query module, multiple queries using a natural language module, where the natural language module incorporates natural language into the queries, where the queries are based on the question and the hypotheses. The method can also include sending the queries to multiple data sources. The method can further include receiving data from the data sources in response to the queries. The method can also include evaluating the data to generate evaluated data. The method can further include presenting, to the user using a triage module on the display, the evaluated data. The method can also include receiving, from the user by the triage module on the display, a first selection of at least one data item of the evaluated data. The method can further include converting, by the triage module, the at least one data item into evidence. The method can also include receiving a second selection of the evidence applied to a hypothesis among the hypotheses. The method can further include evaluating, by an assessment module, the hypothesis against the question. The method can also include presenting, by the assessment module on the display, an assessment of the hypothesis against the question. The method can further include receiving, from the user on the display, confirmation that the hypothesis answers the question.

These and other aspects, objects, features, and embodiments will be apparent from the following description and the appended claims.

BRIEF DESCRIPTION OF THE DRAWINGS

The drawings illustrate only example embodiments and are therefore not to be considered limiting in scope, as the example embodiments may admit to other equally effective embodiments. The elements and features shown in the drawings are not necessarily to scale, emphasis instead being placed upon clearly illustrating the principles of the example embodiments. Additionally, certain dimensions or positions may be exaggerated to help visually convey such principles. In the drawings, reference numerals designate like or corresponding, but not necessarily identical, elements.

FIGS. 4A-4E show various views of an output of a triage module in accordance with certain example embodiments.

FIGS. 6A-6D show various views of an output of a reporting module in accordance with certain example embodiments.

DETAILED DESCRIPTION

Figure 1:
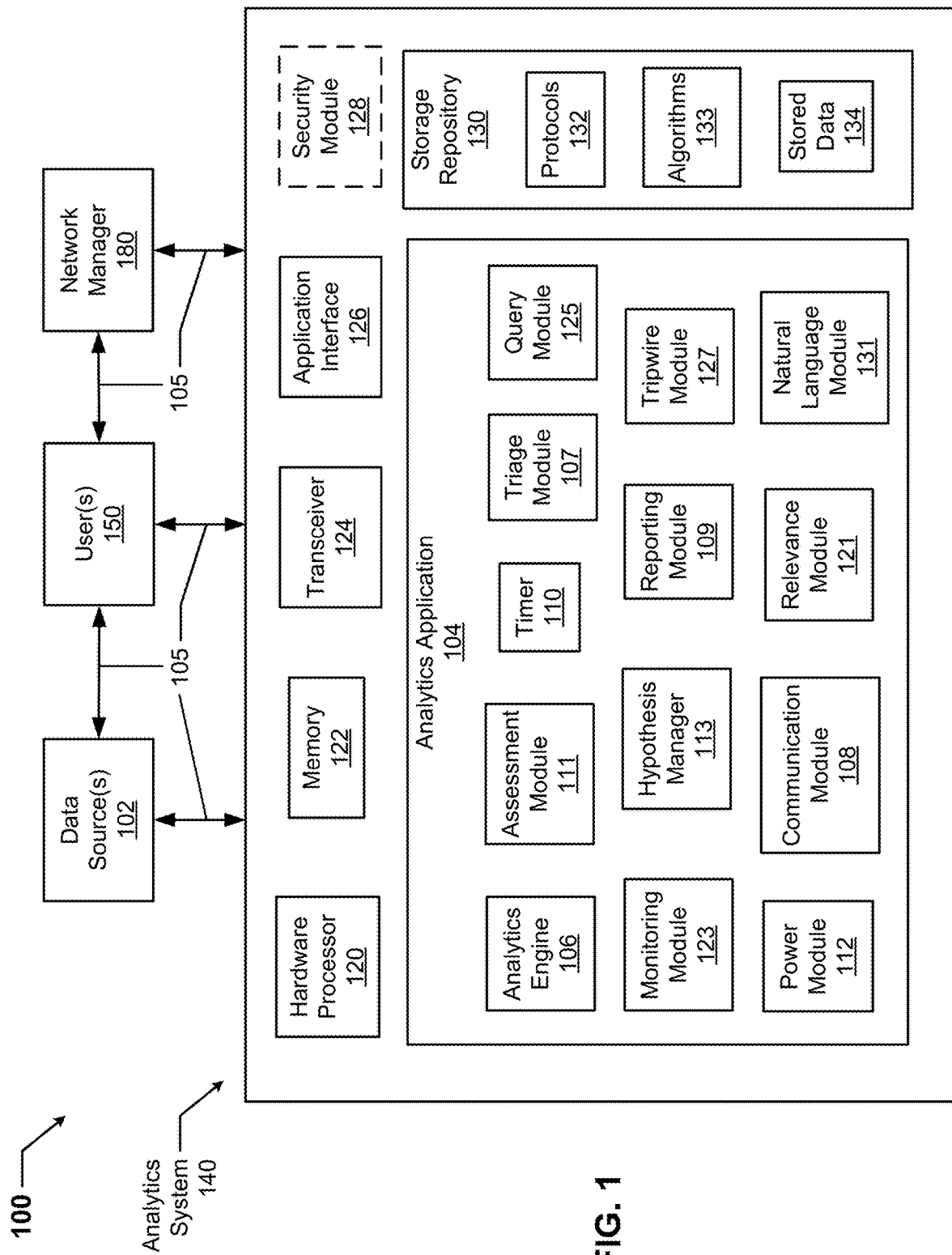
FIG. 1 shows a diagram of a system in accordance with certain example embodiments.

In general, example embodiments provide systems, methods, and devices for interactive structured analytic systems. Example embodiments can be used in any of a number of fields, including but not limited to security, medical treatment, investment, maintenance, crime prevention, damage control, and resource allocation. Example embodiments can be used by public (e.g., government) or private entities. Example embodiments can be used for purely domestic or international issues.

Example embodiments are designed to solicit input from a user throughout the analysis process. For example, a broad array of data is retrieved by the example system, and then the example system organize the data to allow a user to focus on the data most relevant to resolving a question at issue. In this way, example embodiments do not perform a filtering function that could discard data that would be important for the consideration of a user, thereby avoiding a less-than-optimal solution. In other words, example embodiments offset cognitive biases that plague similar systems currently used to solve problems. Example embodiments are designed to enhance, optimize, and improve tradecraft as that term applies to answering complex questions, particularly in the field of intelligence.

In the foregoing figures showing example embodiments of interactive structured analytics systems, one or more of the components shown may be omitted, repeated, and/or substituted. Accordingly, example embodiments of interactive structured analytics systems should not be considered limited to the specific arrangements of components shown in any of the figures. For example, features shown in one or more figures or described with respect to one embodiment can be applied to another embodiment associated with a different figure or description.

In addition, if a component of a figure is described but not expressly shown or labeled in that figure, the label used for a corresponding component in another figure can be inferred to that component. Conversely, if a component in a figure is labeled but not described, the description for such component can be substantially the same as the description for a corresponding component in another figure. Further, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings is capable of being included in one or more claims that correspond to such one or more particular drawings herein. The numbering scheme for the various components in the figures herein is such that each component is a three digit number, and corresponding components in other figures have the identical last two digits.

In some cases, example embodiments can be subject to meeting certain standards and/or requirements. Examples of entities that set and/or maintain standards include, but are not limited to, the Department of Energy (DOE), the Department of Defense (DOD), and the National Security Agency (NSA). Use of example embodiments described herein solve problems in compliance with such standards when required.

Example embodiments of interactive structured analytics systems will be described more fully hereinafter with reference to the accompanying drawings, in which example embodiments of interactive structured analytics systems are shown. Interactive structured analytics systems may, however, be embodied in many different forms and should not be construed as limited to the example embodiments set forth herein. Rather, these example embodiments are provided so that this disclosure will be thorough and complete, and will fully convey the scope of interactive structured analytics systems to those of ordinary skill in the art. Like, but not necessarily the same, elements (also sometimes called components) in the various figures are denoted by like reference numerals for consistency.

Terms such as "first", "second", "third", "height", "top", "bottom", "side", and "within" are used merely to distinguish one component (or part of a component or state of a component) from another. Such terms are not meant to denote a preference or a particular orientation, and are not meant to limit embodiments of interactive structured analytics systems. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

FIG. 1 shows a diagram of a system 100 in accordance with certain example embodiments. The system 100 of FIG. 1 can include an analytics system 140, one or more data sources 102, one or more users 150, and an optional network manager 180. The analytics system 140 can include one or more components. For example, in this case, the analytics system 140 includes an analytics application 104, a storage repository 130, a hardware processor 120, a memory 122, a transceiver 124, an application interface 126, and an optional security module 128.

The analytics application 104 of the analytics system 140 can include one or more of a number of components. Such components, can include, but are not limited to, an analytics engine 106, a communication module 108, a timer 110, an assessment module 111, a power module 112, a reporting module 109, a triage module 107, a hypothesis manager 113, a relevance module 121, a natural language module 131, a monitoring module 123, a query module 125, and a tripwire module 127. The components shown in FIG. 1 are not exhaustive, and in some embodiments, one or more of the components shown in FIG. 1 may not be included in the example system 100. Further, one or more components shown in FIG. 1 can be rearranged. For example, the storage repository 130 can be part of the analytics application 104. Any component of the example system 100 can be discrete or combined with one or more other components of the system 100. For example, the relevance module 121 can be part of the triage module 107. As another example, some of the functions described below for the assessment module 111 can be performed by the triage module 107.

A user 150 may be any person or entity that interacts with the data sources 102, the network manager 180, and/or the analytics system 140. Examples of a user 150 may include, but are not limited to, an engineer, an analyst, a business owner, a government employee, military personnel, a physician, an operator, a consultant, a network manager, a contractor, and a manufacturer's representative. There can be one or multiple users 150 of the system 100 at the same time. When there are multiple user 150 of the system 100 at one time, such users 150 can be working independently of each other or in collaboration with each other. Multiple users 150 can be located anywhere (e.g., on different continents, in the same room, in the same building) relative to each other.

A user 150 can use a user system (not shown), which may include a display (e.g., a GUI). Examples of a user system can include, but are not limited to, a smart phone, a laptop computer, a desktop computer, a tablet, and a smart television. A user 150 can interact with (e.g., sends data to, receives data from) the analytics system 140 via the application interface 126 (described below). A user 150 can also interact with one or more of the data sources 102 and/or the network manager 180. Interaction between a user 150, the analytics system 140, the data sources 102, and the network manager 180 is conducted using signal transfer links 105.

As stated above, the system 100 can include one or more data sources 102. Each data source 102 can have information that is useful for a particular inquiry run by the analytics system 140. Examples of a data source 102 include, but are not limited to, a newspaper, a government agency database, a blog, a corporation, a social media site, a book, a person, a website, an audio recording, and a video recording.

A data source 102 can be capable of communicating with the analytics system 140. For example, a data source 102 can receive a request for information from the analytics system 140. In such a case, the data source 102 can retrieve and send the requested information to the analytics system 140. As another example, a data source 102 can engage in back-and-forth communication with the analytics system 140 in order to ascertain and provide the information sought by the analytics system 140. Similarly, a data source 102 can communicate with a user 150 and/or the network manager 180.

The information available from or provided by a data source 102 can be narrowly focused or very broad. A data source 102 can be publicly available (e.g., the Internet) or private (e.g., requires a subscription or a membership). A data source 102 can be maintained by a private or public entity. The information of a data source 102 can be public, confidential, subscription-based, classified (at various levels), or unclassified. In the case of non-public information, a data source 102 can verify the proper permissions and/or clearances before releasing such information to the analytics system 140, a user 150, and/or the network manager 180.

The network manager 180 is a device or component that controls all or a portion of a communication network that includes the analytics system 140, the users 150, and the data sources 102. The network manager 180 can be substantially similar to the analytics system 140. Alternatively, the network manager 180 can include one or more of a number of features in addition to, subtracted from, and/or altered from the features of the analytics system 140 described below. As described herein, communication with the network manager 180 can include communicating with one or more other components of the system 100. In such a case, the network manager 180 can facilitate such communication. In some cases, one or more functions of the network manager 180 can be shared with the analytics system 140.

Each signal transfer link 105 can include wired (e.g., Class 1 electrical cables, Class 2 electrical cables, electrical connectors, electrical conductors, electrical traces on a circuit board, power line carrier, RS485) and/or wireless (e.g., Wi-Fi, visible light communication, Zigbee, mobile apps, text/email messages, cellular networking, Bluetooth, WirelessHART, ISA100) technology. For example, a signal transfer link 105 can be (or include) one or more electrical conductors that are coupled to the analytics system 140 and to the network manager 180. A signal transfer link 105 can transmit signals (e.g., communication signals, control signals, data) between the analytics system 140, the users 150, the data sources 102, and/or the network manager 180. One or more signal transfer links 105 can also transmit signals and power, respectively, between components (e.g., analytics engine 106, triage module 107, hardware processor 120) within the analytics system 140.

The users 150, the data sources 102, and the network manager 180 can interact with the analytics system 140 using the application interface 126 in accordance with one or more example embodiments. Specifically, the application interface 126 of the analytics system 140 receives data (e.g., information, communications, instructions, updates to firmware) from and sends data (e.g., information, communications, instructions) to the users 150, the data sources 102, and the network manager 180. The users 150, the data sources 102, and the network manager 180 (including portions thereof) can include an interface to receive data from and send data to the analytics system 140 in certain example embodiments. Examples of such an interface can include, but are not limited to, a graphical user interface, a touchscreen, an application programming interface, a keyboard, a monitor, a mouse, a web service, a data protocol adapter, some other hardware and/or software, or any suitable combination thereof. For example, referring to FIG. 2 below, the analytics system 140 can include a user interface having one or more of a number of I/O devices 216 (e.g., buzzer, alarm, indicating light, pushbutton).

The analytics system 140, the users 150, the data sources 102, and the network manager 180 can use their own system or share a system in certain example embodiments. Such a system can be, or contain a form of, an Internet-based or an intranet-based computer system that is capable of communicating with various software. A computer system includes any type of computing device and/or communication device, including but not limited to the analytics system 140. Examples of such a system can include, but are not limited to, a desktop computer with Local Area Network (LAN), Wide Area Network (WAN), Internet or intranet access, a laptop computer with LAN, WAN, Internet or intranet access, a smart phone, a server, a server farm, an android device (or equivalent), a tablet, smartphones, and a personal digital assistant (PDA). Such a system can correspond to a computer system as described below with regard to FIG. 2.

Further, as discussed above, such a system can have corresponding software (e.g., user software, sensor device software). The software can execute on the same or a separate device (e.g., a server, mainframe, desktop personal computer (PC), laptop, PDA, television, cable box, satellite box, kiosk, telephone, mobile phone, or other computing devices) and can be coupled by the communication network (e.g., Internet, Intranet, Extranet, LAN, WAN, or other network communication methods) and/or communication channels, with wire and/or wireless segments according to some example embodiments. When a server is involved, the server can be cloud/cloud services-based (e.g., implemented on a web services platform). The software of one system can be a part of, or operate separately but in conjunction with, the software of another system within the system 100.

The analytics system 140 can be a stand-alone device or integrated with another component in the system 100. For example, the analytics system 140 can include software loaded on a user system of a user 150. As another example, the analytics system 140 can be part of the network manager 180. When the analytics system 140 is a stand-alone device, the analytics system 140 can include a housing. In such a case, the housing can include at least one wall that forms a cavity. In some cases, the housing can be designed to comply with any applicable standards so that the analytics system 140 can be located in a particular environment (e.g., a hazardous environment, a high temperature environment, a high humidity environment).

The housing of the analytics system 140 can be used to house one or more components of the analytics system 140. For example, the analytics system 140 (which in this case includes the analytics application 104 (which includes the control engine 106, the communication module 108, the timer 110, the assessment module 111, the power module 112, the triage module 107, the reporting module 109, the hypothesis manager 113, the relevance module 121, natural language module 131, the monitoring module 123, the query module 125, and the tripwire module 127), the storage repository 130, the hardware processor 120, the memory 122, the transceiver 124, the application interface 126, and the optional security module 128) can be disposed in a cavity formed by a housing. In alternative embodiments, any one or more of these or other components of the analytics system 140 can be disposed on a housing and/or remotely from a housing.

The storage repository 130 can be a persistent storage device (or set of devices) that stores software and data used to assist the analytics system 140 in communicating with the users 150, the data sources 102, and the network manager within the system 100. In one or more example embodiments, the storage repository 130 stores one or more protocols 132, algorithms 133, and stored data 134. The protocols 132 can be any procedures (e.g., a series of method steps) and/or other similar operational procedures that the analytics engine 106 of the analytics system 140 follows based on certain conditions at a point in time. The protocols 132 can include any of a number of communication protocols that are used to send and/or receive data between the analytics system 140, a user 150, the data sources 102, and the network manager 180.

A protocol 132 can be used for wired and/or wireless communication. Examples of a protocol 132 can include, but are not limited to, Econet, Modbus, profibus, Ethernet, and fiberoptic. One or more of the protocols 132 used for communication can be a time-synchronized protocol. Examples of such time-synchronized protocols can include, but are not limited to, a highway addressable remote transducer (HART) protocol, a wireless HART protocol, and an International Society of Automation (ISA) 100 protocol. In this way, one or more of the protocols 132 used for communication can provide a layer of security to the data transferred within the system 100.

The algorithms 133 can be any formulas, models (e.g., risk assessment models, natural language models), and/or other suitable means of manipulating and/or processing data. One or more algorithms 133 can be used for a particular protocol 132. As discussed below, the analytics system 140 uses information (e.g., data) provided by the data sources 102 to generate, using one or more protocols 132 and/or one or more algorithms 133, as well as input from one or more users 150, evidence that supports a hypothesis, query, and/or other objective for reaching a solution to a problem presented to the system 100.

For example, the analytics system 140 can use one or more protocols 132 and/or one or more algorithms 133 to present data to a user 150 so that the user 150 can manipulate the data to determine whether the data should be considered evidence and, if so, to assess each piece of evidence against each hypotheses (a potential answer to the question being analyzed) to determine if that piece of evidence affirms or refutes each hypotheses. As another example, a protocol 132 and/or an algorithm 133, in conjunction with input from a user 150, can be used to rate whether particular evidence (or source thereof) is reliable. As yet another example, analytics system 140 can use one or more protocols 132 and/or one or more algorithms 133 can be used to process, retrieve, and organize meta data and meta content for each piece of data received from a data source 102.

Stored data 134 can be any information (e.g., meta data, meta content, raw data) associated with data received from a data source 102. Stored data 134 can also include, but is not limited to, prior inquiries, prior search results, prior conclusions, prior inputs from a user 150, time measured by the timer 110, adjustments to a protocol 132, substitute names and values, user preferences, default values, results of previously run protocols 132 and/or previously calculated algorithms 133, trustworthiness of a data source 102, and any other suitable data used to help analyze and resolve an inquiry. Such data can be any type of data, including but not limited to historical data, current data, forecasts, actual data, estimates, approximations, and summaries. The stored data 134 can be associated with some measurement of time derived, for example, from the timer 110.

Examples of a storage repository 130 can include, but are not limited to, a database (or a number of databases), a file system, a hard drive, flash memory, the cloud, some other form of solid state data storage, or any suitable combination thereof. The storage repository 130 can be located on multiple physical machines, each storing all or a portion of the protocols 132, the algorithms 133, and/or the stored data 134 according to some example embodiments. Each storage unit or device can be physically located in the same or in a different geographic location.

The storage repository 130 can be operatively connected to the analytics engine 106. In one or more example embodiments, the analytics engine 106 includes functionality to communicate with the users 150, the data sources 102, and the network manager 180 in the system 100. More specifically, the analytics engine 106 sends information to and/or receives information from the storage repository 130 in order to communicate with the users 150, the data sources 102, and the network manager 180. As discussed below, the storage repository 130 can also be operatively connected to the communication module 108 in certain example embodiments.

In certain example embodiments, the analytics engine 106 of the analytics system 140 controls the operation of and/or coordination between one or more components (e.g., the communication module 108, the timer 110, the transceiver 124, the triage module 107, the assessment module 111) of the analytics system 140. For example, the analytics engine 106 can activate the communication module 108 when the communication module 108 is in "sleep" mode and when the communication module 108 is needed to send data received from another component (e.g., a data source 102) in the system 100. As another example, the analytics engine 106 can acquire the current time using the timer 110. As yet another example, the analytics engine 106 can seek input from a user 150 in order to proceed with an analysis based on the input.

Figure 8:
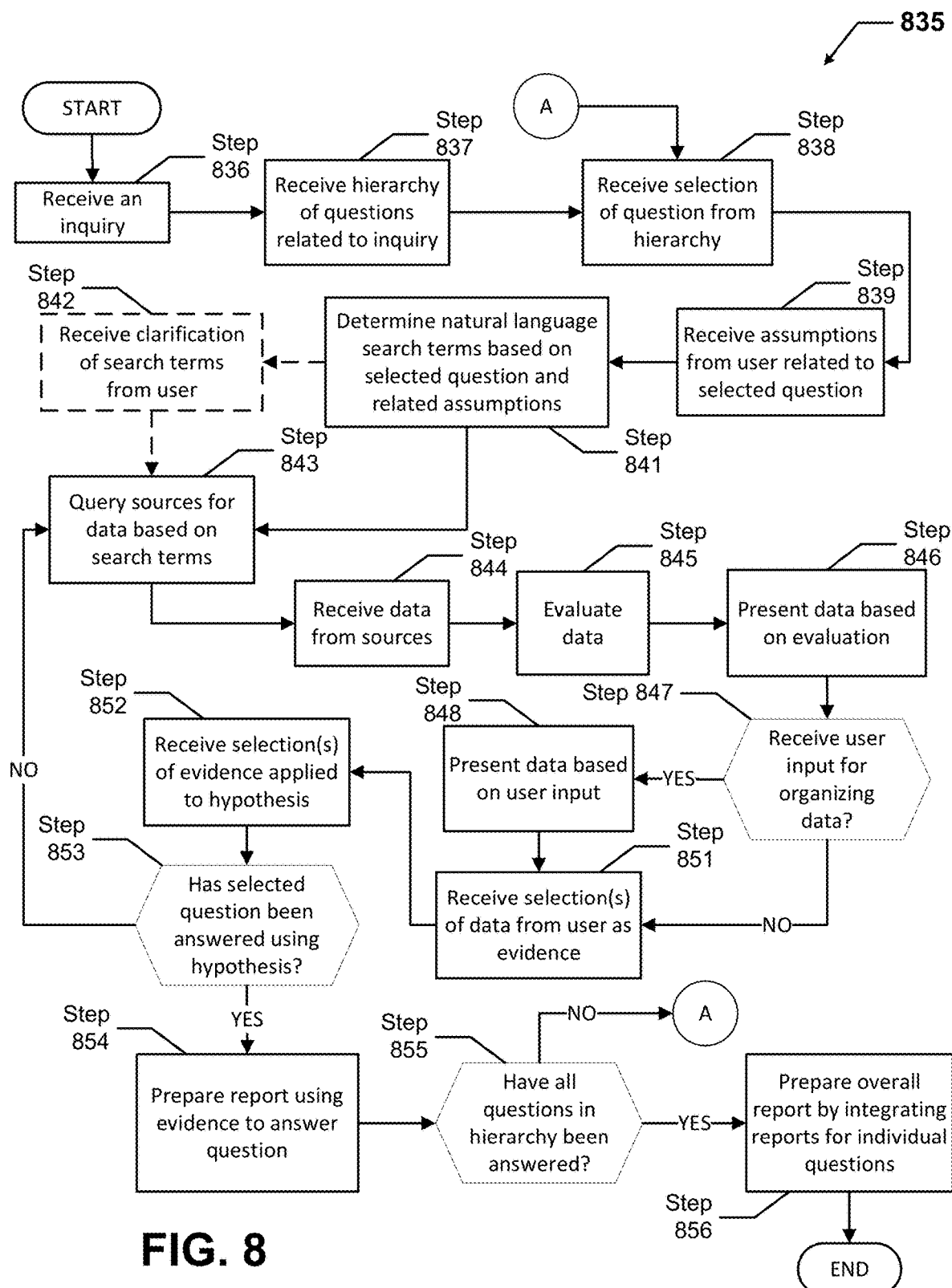
FIG. 8 shows a flowchart of a method for solving a problem in accordance with certain example embodiments.

The analytics engine 106 can be configured to perform a number of functions that help the analytics system 140 find, manipulate, assess, organize, and present data to a user 150 so that the user 150 can find a solution to an inquiry. For example, the analytics engine 106 can execute any of the protocols 132 and/or algorithms 133 stored in the storage repository 130 and use the results of those protocols 132 and/or algorithms 133 to seek periodic input from a user 150 and eventually arrive at a solution to an inquiry. As another example, if there is an ambiguous or indefinite term in an inquiry or sub-inquiry, the analytics engine 106 can seek input from a user 150 to clarify those ambiguous and indefinite terms before proceeding. In addition, or in the alternative, the analytics engine 106 can use the natural language module 131 to find one or more natural language synonyms for a particular word or phrase. FIG. 8 provides a more specific example of how the analytics engine 106 and other components of the analytics application 104 function according to certain example embodiments.

The analytics system 140 relies on a single question or a network of questions to solve a problem. One or more of the users 150 provide this single question or network of questions to the analytics system 140. In some cases, one or more portions (e.g., the hypothesis manager 113, the query module 125) of the analytics system 140 can be used to suggest a new question or suggest a modification to an existing question within the network of questions. In such a case, the one or more users 150 can have the ultimate authority and control as to the questions used and how those questions are worded.

If the analytics system 140 assists in creating one or more questions used to solve a problem, the hypothesis manager 113 can be configured to create one or more questions in a network of questions. The network of questions, regardless of the source of generation, starts with the main inquiry at the top of the network, and directly from there can be one or more sub-questions that, when answered by a user 150, support the answer to the inquiry (or, more specifically, provide evidence for the question next-highest or otherwise related in the network). Put another way, the inquiry is decomposed into a number of questions and sub-questions (e.g., by the users 150, by the hypothesis module 113).

A hypothesis is specific to a question within the network of questions. A hypothesis is typically established by a user 150, but in some cases can be generated or assisted by the hypothesis manager 113 or some other component of the analytics application 104. A hypothesis is a potential answer to a question. Each hypothesis is tested using the hypothesis manager 113 by assessing available evidence and/or assumptions that apply to that hypothesis. If a hypothesis is strongly supported by evidence, the hypothesis manager 113 notifies the user 150 that the hypothesis is a viable answer, and the user 150 can subsequently select the hypothesis as an answer to the question. Conversely, if a hypothesis is not supported by evidence, the hypothesis manager 113 notifies the user 150 that the hypothesis is not a viable answer, and the user 150 can subsequently remove or ignore the hypothesis as an answer to the question.

Similarly, when a hypothesis is supported by an assumption, the hypothesis manager 113 notifies the user that data is needed to support the assumption so that the assumption can become evidence. When a hypothesis is associated with a query or main question in the network of questions, the hypothesis is continually evaluated as sub-questions throughout the network of questions are addressed and as input and selections (e.g., selection of data as evidence) from one or more users 150 are received.

One or more of these sub-questions can themselves have one or more sub-questions, and so on until the network is complete. In other words, the network of questions that is generated is like a relational tree, where some of the nodes can cross over to other branches in addition to being used in its own branch. Ultimately, all of the questions and sub-questions are created or approved by one or more of the users 150. Similarly, all of the questions in the network are answered by one or more of the users 150 based on the data provided to the users 150 by the analytics system 140. An example of a network of questions is shown with respect to FIG. 3 below.

When there are multiple sub-questions in a network to solve a problem, the analytics engine 106 can coordinate to have two or more of the sub-questions to be worked on (answered by one or more users 150) simultaneously. In such a case, the analytics engine 106 can perform parallel processing for simultaneous use of the analytics system 140 by all of the multiple users 150.

When questions are created by the analytics system 140, the various sub-questions that are generated can be based on one or more of a number of factors, including but not limited to one or more protocols 132, one or more algorithms 133, input from a user 150, and stored data 134 (e.g., similar historical inquiries, forecasts, historical data). Regardless of origin, a question in a network can be directed by the triage engine 107 to a user 150, as for clarification. For example, if an inquiry uses a pronoun (e.g., he, she, they) or other ambiguous term (e.g., tomorrow), the query module 125 can interact with a user 150 to define the pronoun or other ambiguous term.

In some cases, the query module 125 or the analytics engine 106 can seek this clarification before generating a question in the network of questions and/or before sending requests for data to one or more data sources 102. The natural language module 131 can provide suggestions to the user 150 as to the specific meaning of an ambiguity. These suggestions can be based, for example, on historical data (stored data 134) and/or algorithms 133. These clarifications form a better 'seed' for the data retrieval services to be both broader and more accurate as the query module 125 interacts with the data sources 102.

One or more users 150 can also generate one or more assumptions related to a question at issue. These assumptions are presumed by the analytics engine 106 to be true, but the analytics engine 106 is configured to test each assumption using data received from data sources 102 based on queries sent to those data sources 102 by the query module 125. In some cases, if an assumption is proved (for example, by a user 150 or by the triage module 107) to be incorrect or weakened based on data, the analytics engine 106, using the triage module 107, presents this problem to the user 150 so that the user 150 can take corrective action (e.g., change the assumption, eliminate the assumption). These assumptions can be linked to the functions served by other components of the analytics system 140. For example, one or more assumptions can be linked to a tripwire that is generated by the tripwire module 127 (discussed below).

When a question in the network of questions is created (or, if assisted by the analytics system 140, selected) by a user 150, the question can be answered by the user 150 by providing information to the user 150 in a way that helps the user 150 make a learned decision. One way that this can be accomplished is by using the query module 125 to query one or more of the data sources 102. For example, the query module 125 can generate one or more queries (based on the question selected by the user 150). The query module 125 can then submit those one or more queries to one or more data sources 102. When the queries are sent by the query module 125, the recipient data sources 102 can be specifically identified by the query module (e.g., based on the question at issue). Alternatively, the query module 125 can broadcast the one or more queries generally to all data sources 102 that can communicate with the analytics system 140. In yet other embodiments, the query module 125 can determine which of the data sources 102 receive the one or more queries using some other filter or criteria.

Overall, the query module 125 is designed to find a wide array of data, even conflicting data. This configurations helps to eliminate biases that can be developed by a user 150 in trying to answer a question in the network of questions. With all of this data, acquired by the query module 125, the triage module 107 can present the data in a number of ways that allow a user 150 to determine which data should be considered evidence and which data should be ignored.

The query module 125 can ensure that each communication that it sends is in the proper format and has the proper clearance (e.g., passwords, access codes), if applicable, to access data from a particular data source 102. Once the data sources 102 receive the one or more queries, the data sources 102 can send data that is relevant to each of the queries to the query module 125. Once the data has been received from the various data sources 102, the query module 125 can format the data so that the data can be understood by the analytics engine 106, the triage module 127, and/or any other component of the analytics system 104. In certain example embodiments, generating the queries by the query module 125, sending the queries by the query module 125 to the data sources 102, retrieving the relevant data by the data sources 102, sending the relevant data from the data sources 102 to the query module 125, and processing the relevant data can be performed in substantially real time (e.g., within a few seconds). As used herein the term "real time" means having a minimum delay due to processing speeds, connection speeds, and the like.

In certain example embodiments, the query module 125 communicates with the data sources 102 based on a ranking or preference. The ranking or preference of the data sources 102 can be an indication of reliability, promptness, accuracy of data, preference of a user 150, relevance to the subject of the inquiry (or question being addressed), availability of the data source 102 at the time of the communication, and/or any other factor. The ranking or preference of the data sources 102 can be established, at least in part, by the query module 125, the analytics engine 106, a user 150, the network manager 180, and/or some other component of the analytics system 140. The ranking or preference of the data sources 102 can be historical or instantaneous. The ranking or preference of the data sources 102 can be part of the stored data 134.

Data that is received by the query module 125 from the data sources 102 can be presented by the triage module 107 to one or more users 150 so that the users 150 can determine whether the data should be considered evidence. The impact and meaning of that evidence is then assessed, with assistance from the assessment module 111, against each hypothesis of the question at issue so that a user 150 can determine whether a hypothesis is an answer to the question at issue. This presentation of the data to a user 150 can be raw, unprocessed data presented by the query module 125. Alternatively, the query module 125 can send some or all of the raw data received from the data sources 102 to the triage module 107. Once evidence is declared by the user 150 (i.e., certain data is selected by a user 150 to answer the question at issue), the evidence can be presented to a user 150 for consideration along with other information (e.g., hypotheses, expected data) by the triage module 107.

In certain example embodiments, the natural language module 131 of the analytics application 104 is used to analyze the language used in one or more of the questions in the network and determine if some of the language (e.g., words, phrases) has any practical alternatives, substitutes, or complements. This use of common-use language can help one or more user 150 develop more focused language for one or more questions. In some cases, such changes proposed by the natural language module 131 are automatically used. In other cases, the changes proposed by the natural language module 131 are subject to acceptance or rejection by a user 150.

The natural language module 131 can be used with the query module 125 to provide alternative language options so that the broadest scope of results (data) can be sent back to the query module 125 from the data sources 102 in response to those queries. By using the alternative language in the queries, the resulting data is not limited in scope, offering a user 150 a more complete set of data with which to work and evaluate. As an example, if the question at issue is "What are the implications of a Bolsonaro win for US-Brazil relations?", one of the hypothesis is "Worsening relations. Bolsonaro and POTUS may be vying for the role of strongman in the region which could result in a clash of personalities and worsening relations", and the queries generated by the query module 125 and/or the user 150 are "Bolsonaro AND win AND Brazil AND relations", "implications AND Bolsonaro AND win", and "implications AND Brazil AND win", the natural language module 131 can generate a number of alternative (additional) queries.

An example of a listing of such additional queries can include the following:

Bolsonaro AND win AND Bolsonaro
Bolsonaro AND win AND POTUS
Bolsonaro AND win AND worsening AND relations
Bolsonaro AND win AND clash
Bolsonaro AND win AND personalities
Bolsonaro AND win AND region
Bolsonaro AND win AND relations
Bolsonaro AND win AND role
Bolsonaro AND win AND strongman
Brazil AND relations AND Bolsonaro
Brazil AND relations AND POTUS
Brazil AND relations AND worsening AND relations
Brazil AND relations AND clash
Brazil AND relations AND personalities
Brazil AND relations AND region
Brazil AND relations AND relations
Brazil AND relations AND role
Brazil AND relations AND strongman
implications AND Bolsonaro
implications AND POTUS
implications AND worsening AND relations
implications AND clash
implications AND personalities
implications AND region
implications AND relations
implications AND role
implications AND strongman In addition, the natural language module 131 can make additional queries with clarifying language. For example, for each query listed above that includes POTUS, additional queries can be created that substitute POTUS for terms such as "President of the United States", "President of the U.S.", "President Trump", and "Trump". The query module 125, working with the natural language module 131, can create queries using, for example, one or more protocols 132. For instance, the query module 125 can be configured to create a query by using a natural language word or phrase from the question AND a natural language word or phrase from the hypothesis or evidence.

The natural language module 131 can also be used to perform a similar function with respect to the data received from the data sources 102. In such a case, the natural language module 131 reviews some or all of the data received by the query module 125 from the data sources 102 and substitutes certain words or phrases into more natural or common use language. This processing of the data by the natural language module 131 helps a user 150 more quickly and efficiently review and evaluate data to determine which data should be used as evidence in support of an answer for the question at issue. The settings of the natural language module 131 can be set by default, by one or more users 150, based on learning (e.g., input from users 150 over time, common trends in culture), by the network manager 180, based on input from one or more data sources 102, and or some other component or factor.

When the triage module 107 receives data from the query module 125 (which can be processed by the natural language module 131), the triage module 107 processes and organizes the data in such a way that allows a user 150 to easily filter, organize, label, and/or otherwise manipulate the data. Examples of some of the output of the triage module 107 are shown in FIGS. 4A through 4E. For example, the triage module 107 can organize data by how old the data is. As another example, the triage module 107 can pair particular data with each analytic element (e.g., each hypothesis, the question, each piece of evidence) to show relevance of the data to that particular analytic element.

As yet another example, the triage module 107 can organize data based on veracity, tested by the triage module 107 with respect to the data itself and/or the one or more data sources 102 providing the data. As still another example, the triage module 107 can suggest or recommend data that can be prepared with certain evidence. Generally speaking, the triage module 107 can also show whether particular data has the potential to separate a viable hypothesis from a non-viable hypothesis. In other words, the triage module 107 can show a user 150 whether a particular piece of data has significant value to helping the user 150 find an answer to the question at issue.

While data is being obtained and processed by the triage module 107 from the query module 125, the hypothesis manager 113 can, in some cases, present (e.g., recommend) to a user 150 one or more hypotheses that can be applicable to providing an answer to the question at issue. In addition, or in the alternative, the hypothesis manager 113 can receive one or more hypothesis from a user 150. Each hypothesis presented and/or received by the hypothesis manager 113 can be based on one or more of a number of factors, including but not limited to input from a user 150, the questions throughout the network of questions, the data, the evidence in general, on evidence selected by a user 150, and on hypotheses previously selected by a user 150. The hypothesis manager 113 can monitor all of the various selections made by the users 150. In such a case, one or more of the hypotheses that are presented and/or received by the hypothesis manager 113 can be based on such changes, resulting in the user 150 altering, deleting, and/or adding hypotheses over time. Eventually, the user 150 selects a hypothesis that represents the answer to the question at issue.

The triage module 107 provides a number of benefits and serves a number of functions. For example, the triage module 107 can help a user 150 ensure that a question at issue is complete and unambiguous. In such a case, the triage module 107 can provide tools to a user 150 to resolve ambiguities in a question and to provide more context to the question. As another example, the triage module 107 can help a user 150 leverage all of the queries, which are generated by the query module 125 and include natural language words and terms (sometimes called "seeds") that are generated by the natural language module 131. These seeds are the ideas, originated by a user 150, to drive the queries that are generated and the natural language words and terms used therein. In such a case, the triage module 107 can provide tools to a user 150 to ensure that the queries sent by the query module 125 are being sent continuously and smoothly.

As still another example, the triage module 107 can help a user 150 focus on the data that is most relevant (e.g., that applies to most hypotheses). The triage module 107 offers interface tools to help the user 150 focus on this most valuable data. As yet another example, the triage module 107 can help a user 150 link data to existing evidence, or to create new evidence based on the data.

Any hypothesis that are created and/or approved by a user 150 are provided to the triage module 107. In such a case, the triage module 107 can organize data and evidence (which is data selected by a user 150 to help answer the question at issue) in terms of the hypotheses in addition to the functions described above that are performed by the triage module 107. The triage module 107 can additional perform other functions. For example, the triage module 107 can also pair data with tripwires (discussed below) and/or organize data in terms of diagnosticity (also discussed below).

Once the data has been received by the query module 125 from the various data sources 102, the triage module 107 can present data to a user 150 so that the user 150 can analyze and assess the content of the data. Specifically, the triage module 107 can present to a user 150 the meta data (also known as the "envelope" information (e.g., identify of the sender, date sent) associated with the data), the meta content (also known as the general characteristics (e.g., content is in the English language) of the data), and the substantive content (e.g., what the data says) of the data. When data is provided by a user 150 to the triage module 107, the user 150 can select the data as relevant to help answer the question at issue. When this occurs, the selected data becomes evidence. Evidence can later be unselected by a user 150, reverting the evidence to the status of data.

As shown in FIGS. 4A through 4E, the triage module 107 can also categorize and organize the data, evidence, hypotheses, and other considerations relative to helping a user 150 answer a question at issue. As discussed above, this organization and categorization of the data by the triage module 107 can also include matching evidence with relevant hypotheses. These and other pairings, shown for example in FIGS. 4A through 4E, allow a user 150 to more effectively and efficiently view and evaluate data and evidence to reach an answer to the question at issue.

The triage module 107 can also factor in and show to a user 150 one or more tripwires established by the tripwire module 127. A tripwire is a mechanism by which the data and evidence used to support a hypothesis and/or answer a question at issue is not sufficient to support the conclusion being drawn by a user 150 and/or whether certain credible and relevant data and evidence that should be considered to support a hypothesis and/or answer a question at issue is being ignored by a user 150. Put another way, if an assumption is inserted into the process by a user 150 as non-data supported evidence, a tripwire is intended to then monitor for data indicators in the real-time stream of data arriving in the various repositories from the data sources 102 to alert the user 150 that relevant data has just arrived that may invalidate the assumption, that such data should be assessed by the user 150, and that the assumption should be adjusted by the user 150 accordingly.

The tripwire module 127 can operate based on a number of settings, which can be determined by default values, by a user 150, based on historical results, based on a learning function, based on the subject matter of the question at issue, based on the data sources 102 providing data, and/or any of a number of other factors. The tripwire module 127, like the triage module 107, the query module 125, the natural language module 131, the relevance module 121, and many other components of the analytics system 140, can operate continuously or on some periodic basis.

When the triage module 107 categorizes and organizes the data received by the query module 125, the evidence selected by a user 150, tripwires found by the tripwire module 127, and other relevant information discussed herein can be presented to a user 150 in an overview that provides an "all in one" view of the data space, as shown in FIGS. 4A-4E. Further, all of this information presented by the triage module 107 is organized in a way that makes it very easy for a user 150 to efficiently evaluate all of the information (e.g., data, evidence, hypotheses, tripwires) to make a quick, informed, and supported decision. To help with this presentation, the triage module 107 uses results of the relevance module 121.

The relevance module 121 evaluates information (e.g., data, evidence, hypotheses) to determine their particular relevance in being used to answer the question at issue. The relevance module 121 can also determine diagnosticity, which is determining if data and evidence are helpful or useful to the analysis. The results of the relevance module 121 can be presented to a user along with results of the triage module 107 to allow the user 150 to quickly, efficiently, and effectively reach a supported conclusion to answer the question at issue. The results of the relevance module 121 can be shown in such a way as to provide an "all in one" view of the data space.

The evidence, data, hypotheses, tripwires, and other information can be presented in various ways to a user 150. For example, the triage module 107 can present, based on work done by the relevance module 121 and the query module 125, the evidence in terms of expected data versus different hypotheses that are formed. As another example, the triage module 107 can present, based on work done by the relevance module 121 and the query module 125, the evidence paired with expected data. The triage module 107 can also present, based on work done by the relevance module 121 and the query module 125, the volume of evidence for any categories so that a user 150 can incorporate this information into the user's decision process.

An example of a display showing various presentations of the data, evidence, and other information to a user 150 by the triage module 107 is shown below with respect to FIGS. 4A-4E. The user interface for the triage module 107 with a user 150 allows a user 150 to organize, filter, and/or otherwise manipulate data, evidence, and other information in any of a number of ways to help the user 150 efficiently and effectively select certain data that is most relevant to solving the question at issue.

In addition to the data sources 102, data itself can be evaluated. For example, as discussed above, the relevance module 121 can be used to evaluate each piece of data that is received from a data source 102. This evaluation by the relevance module 121 can be used to determine how relevant a piece of data is relative to the question at issue, any hypothesis, and/or any piece of evidence. The relevance of a piece of data can be based on one or more of any number of factors, including but not limited to input from a user 150, subject matter of the data, date that the data was generated, geographical reference of the data, stored data 134, and the data source 102 providing the data.

The data received from data sources 102 can be subject to one or more other (non-relevance) evaluations, as well. Examples of such other evaluations can include, but are not limited to, a veracity evaluation (to evaluate the truthfulness of the content of the data) and an accuracy evaluation (to test the accuracy of the content of the data). Such evaluations can also be performed on the data sources 102. These evaluations can also draw in historical data (stored data 134) from the storage repository 130 in making an evaluation. Such evaluations can be performed by an individual module (e.g., a veracity module, an accuracy module) or by an already-listed module (e.g., triage module 107, relevance module 121) herein. The results of any or all of these evaluations can be communicated to a user 150 to help the user 150 make better-informed selections in answering the question at issue.

When there are multiple users 150, particularly when multiple users 150 are using the analytics system 140 at one time, the various outputs presented to each user by the analytics system 140 are linked and/or coordinated. In this way, the various information (e.g., evidence, hypotheses, sub-questions) is shown to all users 150 at the same time. Further, input from one user 150 and its resulting effect on the network of questions and/or other aspects of the analysis can be immediately processed by the analytics system 140 and shown as updates to all other users 150.

As a question is answered based on input and selections made by a user 150, the answer is sent up to the one or more linked parent questions in the network of questions. In this way, as another question in the network is being addressed, all of the evidence and selections made by a user 150 in answering a different (e.g., downstream, parallel path) question in the network are made available for assessing and responding to the present question being addressed by a user 150. In this way, the analytics application 104 is a recursive network. As with the other functionality of the analytics system 140, this information can be shared amongst all users 150 on a real-time basis.

The assessment module 111 works in conjunction with the triage module 107 and assesses one or more of the various analytic elements (e.g., evidence, hypotheses, expected data) of the triage module 107. In particular, the assessment module 111 evaluates evidence chosen by a user 150 and applies this evaluation to the various hypotheses posed by a user 150 to answer the question at issue. The assessment module 111 can also use some of the evaluations (e.g., relevance, accuracy, veracity, diagnosticity) described above to provide a weighting or ranking of those components to a user 150. Evidence can be assessed by the assessment module 111 as confirming (supporting) or disconfirming (refuting) a hypothesis as an answer to the question at issue. This function of the assessment module 111 lends to analytic rigor, and its output can be categorized as assessment objects in the system. Each of these assessment objects form the detailed content assembled into the output report, generated by the reporting module 109.

The assessment module 111 can also draw in historical data (stored data 134) from the storage repository 130 in making an assessment. An example of a display showing various presentations of the data, evidence, and other factors to a user 150 by the assessment module 111 is shown below with respect to FIGS. 5A-5E. In some cases, display generated by the assessment module 111 can show different areas (e.g., hypotheses, assumptions) where a user 150 needs to provide input to allow the analytics system 140 to properly acquire and process data to help the user 150 answer the question under consideration.

The assessment module 111 offers a number of tools to help a user 150 to assess analytic elements. For example, the assessment module 111 can help a user 150 identify assumptions (which are unsupported by data, as opposed to evidence, which is supported by data) and categorize them separately from evidence. This creates a more complete analysis space, and also helps with data priming. The assessment module 111 can also identify data that can help a user convert an assumption into evidence. As another example, the assessment module 111 can inspect one or more possible initial hypotheses. The assessment module 111 can also allow a user 150 to write descriptions of each hypotheses to help with seeding (creating queries by the query module 125) and match hypotheses to evidence (e.g., by relevance).

As yet another example, the assessment module 111 can allow a user 150 to provide a micro-analysis of each link of evidence to a hypothesis, where this assessment can be used for later support and reporting. As still another example, the assessment module 111 can allow a user 150 to add new hypotheses during an analysis, broadening the scope of hypotheses and providing for a more complete, unbiased analysis. As yet another example, the assessment module 111 can provide for diagnosticity, which can allow for adding hypotheses to result in evidence being diagnostic. This diagnosticity tool can also allow a user 150 to temporarily remove a piece of evidence to see if that removal makes an impact on the analysis. If there is no impact, the user 150 knows that removing the evidence is safe.

As still another example, the assessment module 111 can allow a user 150 to score each hypotheses and compare them. The user 150 also has the ability to set or change the method by which the hypotheses are scored to see if different scoring parameters change the outcome as to the optimal hypothesis. As yet another example, the assessment module 111 can allow a user 150 to perform stress testing on various factors. For instance, a user 150 can adjust the truth confidence for a piece of evidence to determine if the user 150 is relying on low confidence evidence to drive his or her decision.

As still another example, the assessment module 111 can allow a user 150 to determine if a hypothesis ranking is robust. In such a case, a higher instability score means that a slight change to evidence that supports a hypothesis could cause major re-ordering in the ranking of the hypotheses. This indication by the assessment module 111 can instruct the user 150 that adding more evidence can stabilize the ranking scores. As yet another example, the assessment module 111 can allow a user 150 to view the weighted confirming evidence versus the disconfirming evidence for each hypothesis. This shows whether the evidence is sufficiently backed by data, or whether the data is sufficiently robust.

As still another example, the assessment module 111 can allow a user 150 to see whether a single piece of evidence is being overly relied upon, driving the ranking among the hypotheses. In such a case, the assessment module 111 can allow a user 150 to determine how much to trust that evidence and the risk involved in relying so much on the piece of evidence. As yet another example, the assessment module 111 can allow a user 150 to select one or more potential conclusions and publish the ultimate conclusion for other related (e.g. upstream) questions in the network of questions.

A user 150 can also interact with the assessment module 111 to test modifications to expected data or hypotheses. For example, if a user 150 wants to broaden a hypothesis, the assessment module 111 can assess this change and provide information to the user 150 as to the effects that this change can have on answering the question at hand. In such a case, such a change can result in a change in evidence, alterations of one or more other hypotheses, a change in relevance, changes in links between evidence and hypotheses (as driven by a user 150), and/or any of a number of other alterations to the information available to the user 150 that can affect the answer to the question. Such changes can also affect other questions in the network, and if such a change is actually made, then that change is broadcast throughout the overall system by the analytics engine 106 so that any appropriate updates can be made relative to evaluating other questions in the network.

Ultimately, when all of the questions in the network have been answered, the main inquiry can be answered using the same process as each of the other supporting questions. Throughout the process, and also once the main inquiry has been answered, the reporting module 109 can be used to generate and present any of a number of reports regarding the inquiry. The reporting module 109 can present summaries and/or details of any aspect of the inquiry process. The reporting module 109 can be driven automatically, by the network manager 180, or by instructions from a user 150. An example of a display showing various presentations of the data, evidence, and other factors to a user 150 by the reporting module 109 is shown below with respect to FIGS. 6A-6D.

The report module 109 can generate one or more reports automatically (e.g., based on a passage of time, upon answering a question) or on demand from a request by a user 150. In any case, when the report module 109 generates a report, the report can be a compilation of some or all of the analytic elements, microassessments, tradecraft metadata, hypotheses, supporting evidence, and/or any other relevant information relevant to the process of answering one or more questions in the network of questions. The report module, like many of the other components of the analytics application 104, can promote the elimination of bias by the user 150 by generating reports that show evidence, supported by data, and provide all of the support and considerations made in reaching a final answer to a question. A report can span any length of calendar time, and can be sent to any of a number of users 150 (whether on an automated distribution or selected for receipt). A report can be generated by the report module 109 at any time in the process of answering a question, including but not limited to when the question is answered and at any point when the question is being considered.

During the inquiry process, the analytics engine 106 can manage all of the other modules and managers of the analytics application 104 and provide an overview for the information of a user 150. The overview can show any information (e.g., the network of questions, a history of the analysis for the inquiry, questions in the network already answered) associated with the inquiry. The overview content provided by the analytics engine 106 can be driven by default or by preferences/direction from the user 150. An example of a display showing various overview information to a user 150 by the analytics engine 106 is shown below with respect to FIGS. 7A-7E.

The analytics engine 106 can transmit control, communication, and/or other similar signals to the users 150, the data sources 102, and the network manager 180. Similarly, the analytics engine 106 can receive control, communication, and/or other similar signals from the users 150, the data sources 102, and the network manager 180. The analytics engine 106 can control each component (e.g., triage module 107) of the analytics system 140 automatically (for example, based on one or more algorithms 133 stored in the storage repository 130) and/or based on control, communication, and/or other similar signals received from another component of the system 100 through a signal transfer link 105. The analytics engine 106 may include a printed circuit board, upon which the hardware processor 120 and/or one or more discrete components of the analytics system 140 are positioned.

As discussed above, in certain example embodiments, the analytics engine 106 can include an interface that enables the analytics engine 106 to communicate with one or more components (e.g., a user 150) of the system 100. For example, a data source 102 can have a serial communication interface that will transfer data to the analytics engine 106. In such a case, the analytics engine 106 can also include a serial interface to enable communication with the users 150.

Such an interface can operate in conjunction with, or independently of, the protocols 132 used to communicate between the analytics system 140, the users 150, the data sources 102, and the network manager 180.

The analytics engine 106 (or other components of the analytics system 140) can also include one or more hardware components (e.g., peripherals) and/or software elements to perform its functions. Such components can include, but are not limited to, a universal asynchronous receiver/transmitter (UART), a serial peripheral interface (SPI), an analog-to-digital converter, an inter-integrated circuit ($I^2C$), and a pulse width modulator (PWM).

The communication module 108 of the analytics system 140 determines and implements the communication protocol (e.g., from the protocols 132 of the storage repository 130) that is used when the analytics engine 106 communicates with (e.g., sends signals to, receives signals from) the users 150, the data sources 102, and the network manager 180. In some cases, the communication module 108 accesses the stored data 134 to determine which communication protocol is used to communicate with a data source 102 associated with certain stored data 134. In addition, the communication module 108 can interpret the communication protocol of a communication received by the analytics system 140 so that the analytics engine 106 can interpret the communication.

The communication module 108 can send and receive data between the data sources 102, the network manager 180, the users 150, and/or the analytics system 140. The communication module 108 can send and/or receive data in a given format that follows a particular protocol 132. The analytics engine 106 can interpret the data packet received from the communication module 108 using the protocol 132 information stored in the storage repository 130. The analytics engine 106 can also facilitate the data transfer between the data sources 102, the network manager 180, and a user 150 by converting the data into a format understood by the communication module 108.

The communication module 108 can send data (e.g., protocols 132, algorithms 133, stored data 134) directly to and/or retrieve data directly from the storage repository 130. Alternatively, the analytics engine 106 can facilitate the transfer of data between the communication module 108 and the storage repository 130. The communication module 108 can also provide encryption to data that is sent by the analytics system 140 and decryption to data that is received by the analytics system 140. The communication module 108 can also provide one or more of a number of other services with respect to data sent from and received by the analytics system 140. Such services can include, but are not limited to, data packet routing information and procedures to follow in the event of data interruption.

The timer 110 of the analytics system 140 can track clock time, intervals of time, an amount of time, and/or any other measure of time. The timer 110 can also count the number of occurrences of an event, whether with or without respect to time. Alternatively, the analytics engine 106 can perform the counting function. The timer 110 is able to track multiple time measurements concurrently. The timer 110 can track time periods based on an instruction received from the analytics engine 106, based on an instruction received from a user 150, based on an instruction programmed in the software for the analytics system 140, based on some other condition or from some other component, or from any combination thereof.

The timer 110 can be configured to track time when there is no power delivered to the analytics system 140 (e.g., the power module 112 malfunctions) using, for example, a super capacitor or a battery backup. In such a case, when there is a resumption of power delivery to the analytics system 140, the timer 110 can communicate any aspect of time to the analytics system 140. In such a case, the timer 110 can include one or more of a number of components (e.g., a super capacitor, an integrated circuit) to perform these functions.

The power module 112 of the analytics system 140 provides power to one or more other components (e.g., timer 110, analytics engine 106) of the analytics system 140. The power module 112 can include one or more of a number of single or multiple discrete components (e.g., transistor, diode, resistor), and/or a microprocessor. The power module 112 may include a printed circuit board, upon which the microprocessor and/or one or more discrete components are positioned.

The power module 112 can include one or more components (e.g., a transformer, a diode bridge, an inverter, a converter) that receives power (for example, through an electrical cable) from the power supply 135 and generates power of a type (e.g., AC, DC) and level (e.g., 12V, 24V, 120V) that can be used by the other components of the analytics system 140. For example, 120 VAC received from an external power supply by the power module 112 can be converted to 12 VDC by the power module 112. The power module 112 can use a closed control loop to maintain a preconfigured voltage or current with a tight tolerance at the output.

The power module 112 can also protect the remainder of the electronics (e.g., hardware processor 120, transceiver 124) in the analytics system 140 from surges generated in the line. In addition, or in the alternative, the power module 112 can be a source of power in itself to provide signals to the other components of the analytics system 140. For example, the power module 112 can be a battery.

The hardware processor 120 of the analytics system 140 executes software, algorithms 133, and firmware in accordance with one or more example embodiments. Specifically, the hardware processor 120 can execute software on the analytics engine 106 or any other portion of the analytics system 140, as well as software used by the users 150, the data sources 102, and the master controller 180. The hardware processor 120 can be an integrated circuit, a central processing unit, a multi-core processing chip, SoC, a multi-chip module including multiple multi-core processing chips, or other hardware processor in one or more example embodiments. The hardware processor 120 is known by other names, including but not limited to a computer processor, a microprocessor, and a multi-core processor.

In one or more example embodiments, the hardware processor 120 executes software instructions stored in memory 122. The memory 122 includes one or more cache memories, main memory, and/or any other suitable type of memory. The memory 122 can include volatile and/or non-volatile memory. The memory 122 is discretely located within the analytics system 140 relative to the hardware processor 120 according to some example embodiments. In certain configurations, the memory 122 can be integrated with the hardware processor 120.

In certain example embodiments, the analytics system 140 does not include a hardware processor 120. In such a case, the analytics system 140 can include, as an example, one or more field programmable gate arrays (FPGA), one or more insulated-gate bipolar transistors (IGBTs), and/or one or more integrated circuits (ICs). Using FPGAs, IGBTs, ICs, and/or other similar devices known in the art allows the analytics system 140 (or portions thereof) to be programmable and function according to certain logic rules and thresholds without the use of a hardware processor. Alternatively, FPGAs, IGBTs, ICs, and/or similar devices can be used in conjunction with one or more hardware processors 120.

The transceiver 124 of the analytics system 140 can send and/or receive control and/or communication signals. Specifically, the transceiver 124 can be used to transfer data between the analytics system 140 and the users 150, the data sources 102, and the network manager 180. The transceiver 124 can use wired and/or wireless technology. The transceiver 124 can be configured in such a way that the control and/or communication signals sent and/or received by the transceiver 124 can be received and/or sent by another transceiver that is part of the users 150, the data sources 102, and the network manager 180. The transceiver 124 can use any of a number of signal types, including but not limited to radio frequency signals.

When the transceiver 124 uses wireless technology, any type of wireless technology can be used by the transceiver 124 in sending and receiving signals. Such wireless technology can include, but is not limited to, Wi-Fi, visible light communication, Zigbee, mobile apps, text/email messages, cellular networking, Bluetooth Low Energy, and Bluetooth. The transceiver 124 can use one or more of any number of suitable communication protocols (e.g., ISA100, HART) when sending and/or receiving signals. Such communication protocols can be stored in the communication protocols 132 of the storage repository 130. Further, any transceiver information for a user 150, a data source 102, and the network manager 180 can be part of the stored data 134 (or similar areas) of the storage repository 130.

Optionally, in one or more example embodiments, the security module 128 secures interactions between the analytics system 140, the users 150, the data sources 102, and the network manager 180. More specifically, the security module 128 authenticates communication from software based on security keys (e.g., password, biometric data, voice print, finger print) verifying the identity of the source of the communication. For example, user software may be associated with a security key enabling the software of a user 150 to interact with the analytics system 140. Further, the security module 128 can restrict receipt of information, requests for information, and/or access to information in some example embodiments.

Figure 2:
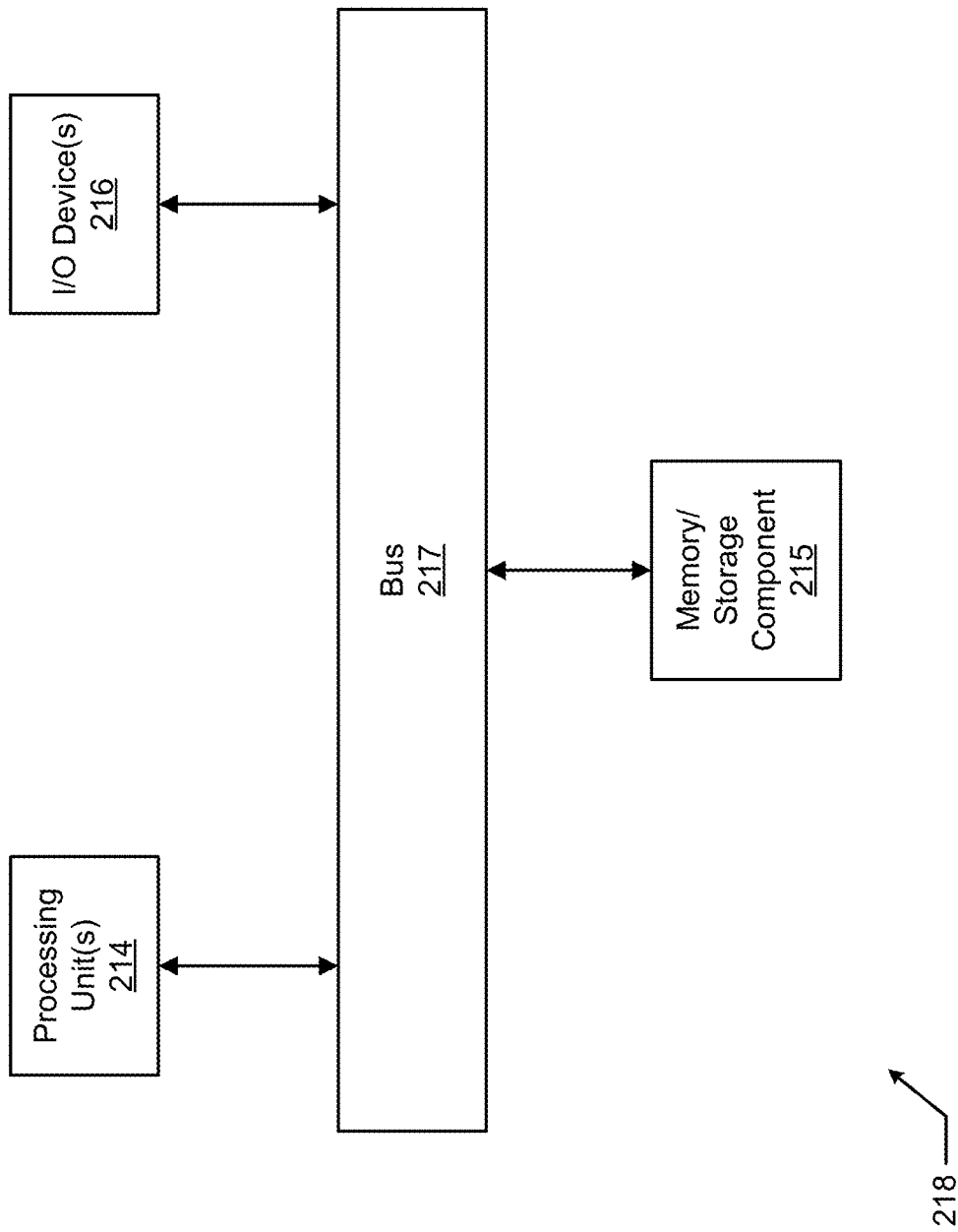
FIG. 2 shows a computing device in accordance with certain example embodiments.

FIG. 2 illustrates one embodiment of a computing device 218 that implements one or more of the various techniques described herein, and which is representative, in whole or in part, of the elements described herein pursuant to certain example embodiments. For example, computing device 218 can be implemented in the analytics system of FIG. 1 in the form of the hardware processor 120, the memory 122, and the storage repository 130, among other components. Computing device 218 is one example of a computing device and is not intended to suggest any limitation as to scope of use or functionality of the computing device and/or its possible architectures. Neither should computing device 218 be interpreted as having any dependency or requirement relating to any one or combination of components illustrated in the example computing device 218.

Computing device 218 includes one or more processors or processing units 214, one or more memory/storage components 215, one or more input/output (I/O) devices 216, and a bus 217 that allows the various components and devices to communicate with one another. Bus 217 represents one or more of any of several types of bus structures, including a memory bus or memory controller, a peripheral bus, an accelerated graphics port, and a processor or local bus using any of a variety of bus architectures. Bus 217 includes wired and/or wireless buses.

Memory/storage component 215 represents one or more computer storage media. Memory/storage component 215 includes volatile media (such as random access memory (RAM)) and/or nonvolatile media (such as read only memory (ROM), flash memory, optical disks, magnetic disks, and so forth). Memory/storage component 215 includes fixed media (e.g., RAM, ROM, a fixed hard drive, etc.) as well as removable media (e.g., a flash memory drive, a removable hard drive, an optical disk, and so forth).

One or more I/O devices 216 allow a customer, utility, or other user to enter commands and information to computing device 218, and also allow information to be presented to the customer, utility, or other user and/or other components or devices. Examples of input devices include, but are not limited to, a keyboard, a cursor control device (e.g., a mouse), a microphone, a touchscreen, and a scanner. Examples of output devices include, but are not limited to, a display device (e.g., a monitor or projector), speakers, outputs to a lighting network (e.g., DMX card), a printer, and a network card.

Various techniques are described herein in the general context of software or program modules. Generally, software includes routines, programs, objects, components, data structures, and so forth that perform particular tasks or implement particular abstract data types. An implementation of these modules and techniques are stored on or transmitted across some form of computer readable media. Computer readable media is any available non-transitory medium or non-transitory media that is accessible by a computing device. By way of example, and not limitation, computer readable media includes "computer storage media".

"Computer storage media" and "computer readable medium" include volatile and non-volatile, removable and non-removable media implemented in any method or technology for storage of information such as computer readable instructions, data structures, program modules, or other data. Computer storage media include, but are not limited to, computer recordable media such as RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which is used to store the desired information and which is accessible by a computer.

The computer device 218 is connected to a network (not shown) (e.g., a LAN, a WAN such as the Internet, cloud, or any other similar type of network) via a network interface connection (not shown) according to some example embodiments. Those skilled in the art will appreciate that many different types of computer systems exist (e.g., desktop computer, a laptop computer, a personal media device, a mobile device, such as a cell phone or personal digital assistant, or any other computing system capable of executing computer readable instructions), and the aforementioned input and output means take other forms, now known or later developed, in other example embodiments. Generally speaking, the computer system 218 includes at least the minimal processing, input, and/or output means necessary to practice one or more embodiments.

Further, those skilled in the art will appreciate that one or more elements of the aforementioned computer device 218 can be located at a remote location and connected to the other elements over a network in certain example embodiments. Further, one or more embodiments is implemented on a distributed system having one or more nodes, where each portion of the implementation (e.g., analytics engine 106) is located on a different node within the distributed system. In one or more embodiments, the node corresponds to a computer system. Alternatively, the node corresponds to a processor with associated physical memory in some example embodiments. The node alternatively corresponds to a processor with shared memory and/or resources in some example embodiments.

Figure 3:
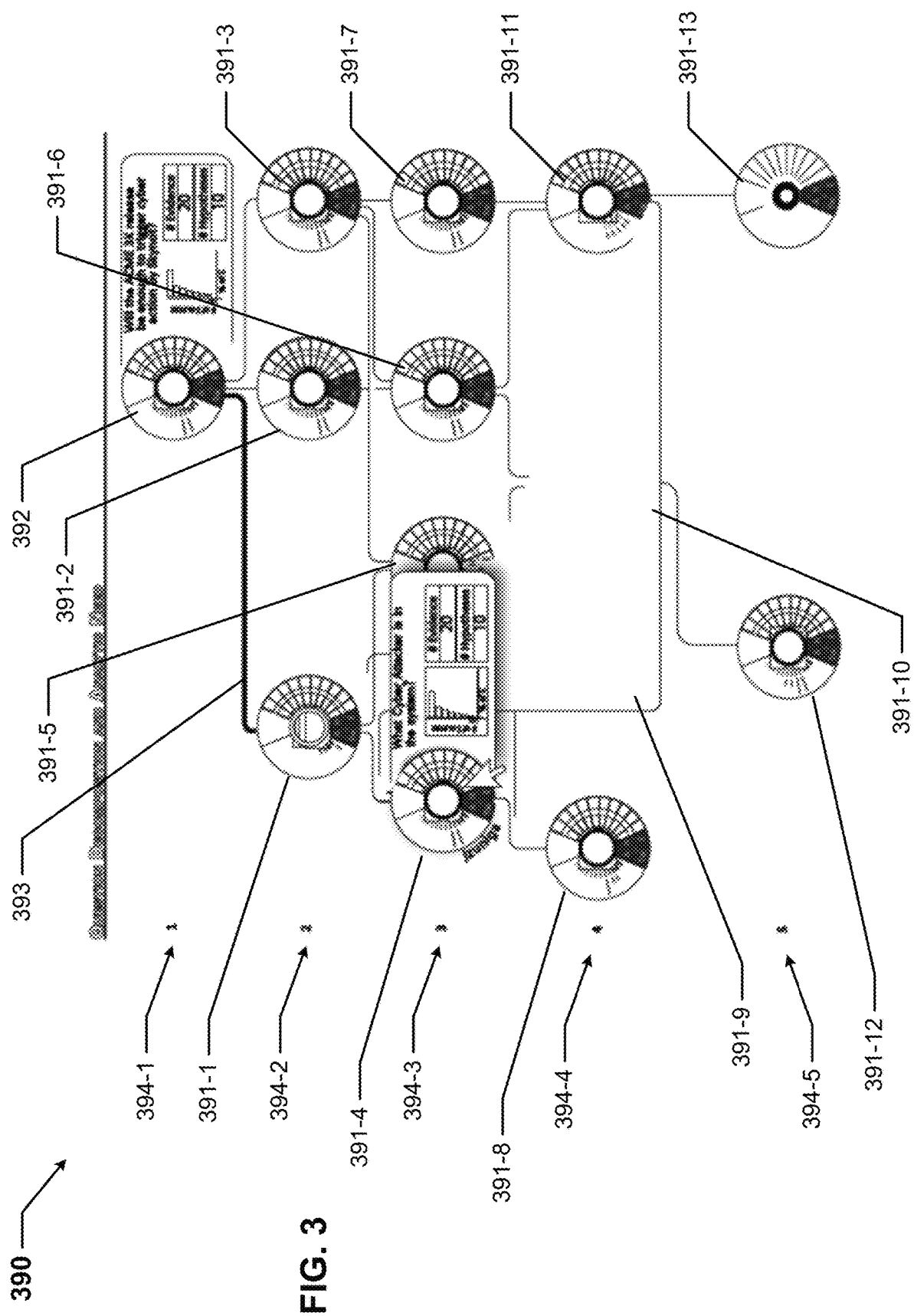
FIG. 3 shows a general example of a network of questions in accordance with certain example embodiments.

FIG. 3 shows a general example of a network 390 of questions 391 in accordance with certain example embodiments. Referring to FIGS. 1-3, the network 390 and questions 391 can be generated by the triage module 107 and is based on the inquiry 392 received by the analytics system 140. In some cases, the triage module 107 can enhance the inquiry 392 as part of the network 390. In this example, there are a total of 13 questions 391 that stem from the inquiry 392. Related questions within the network are linked to each other by links 393. Also, the network 390 has multiple levels 394 of questions 391. In this case, there are 5 levels 394 (level 394-1, level 394-2, level 394-3, level 394-4, and level 394-5) of questions 391.

Question 391-1, question 391-2, and question 391-3 stem directly from the inquiry 392. Question 391-4 stems from question 391-1. Question 391-5 stems from question 391-1 and question 391-3. Question 391-6 stems from question 391-2 and question 391-3. Question 391-7 stems from question 391-3. Question 391-8 stems from question 391-4 and question 391-5. Question 391-9 stems from question 391-1 and question 391-5. Question 391-10 stems from question 391-5 and question 391-6. Question 391-11 stems from question 391-6 and question 391-7. Question 391-12 stems from question 391-10. Question 391-13 stems from question 391-11.

As discussed above, the network 390 is recursive. In other words, the questions 391 (in this case, question 391-12 and question 391-13) at the lowest level 394 (in this case, level 394-5) are addressed first, either simultaneously or one at a time. When question 391-12 is answered, the information is used in answering questions 391-10. Similarly, when question 391-13 is answered, the information is used in answering questions 391-11. When the questions 391 at the lowest level 394 are answered, then the questions 391 (in this case, question 391-8, question 391-9, question 391-10, and question 391-11) at the next level 394 up (in this case, level 394-4) are addressed and answered. The process continues in this way until all of the information from the questions 391 are provided to the user 150 to answer the inquiry 392. As discussed above, one or more users 150 provide the answers to these questions through a user interface.

Figure 4B:
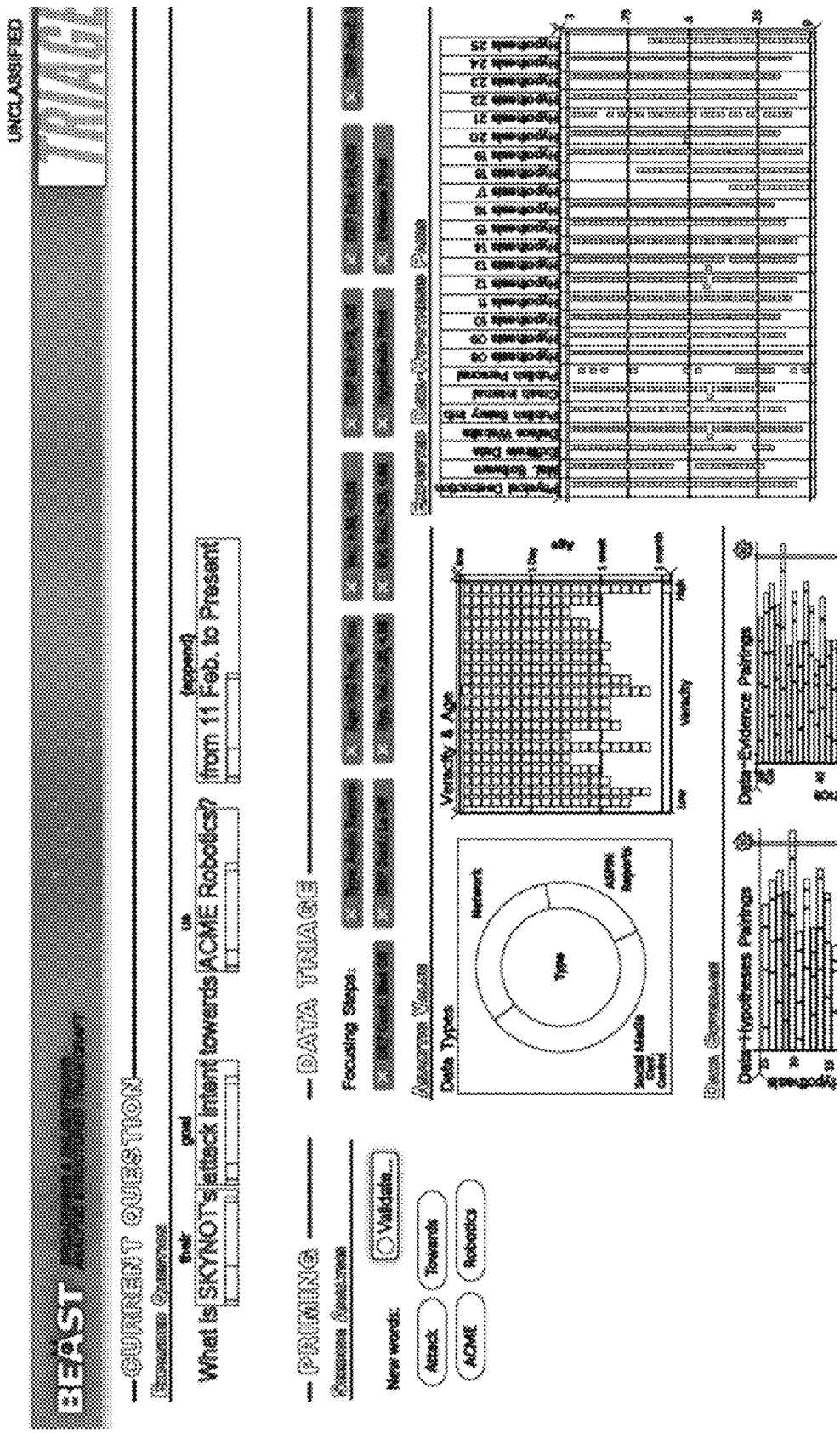
Figure 4C:
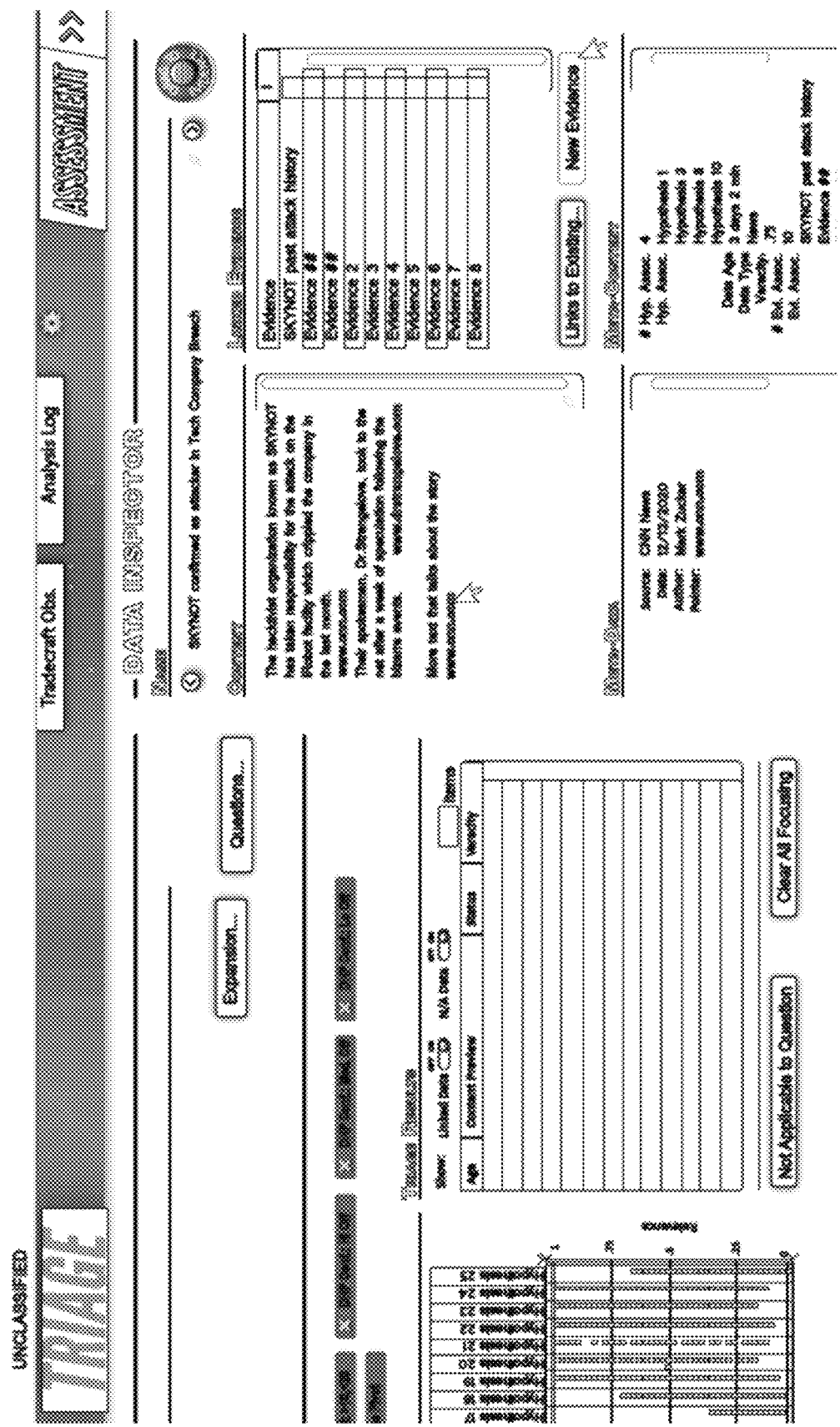
Figure 4D:
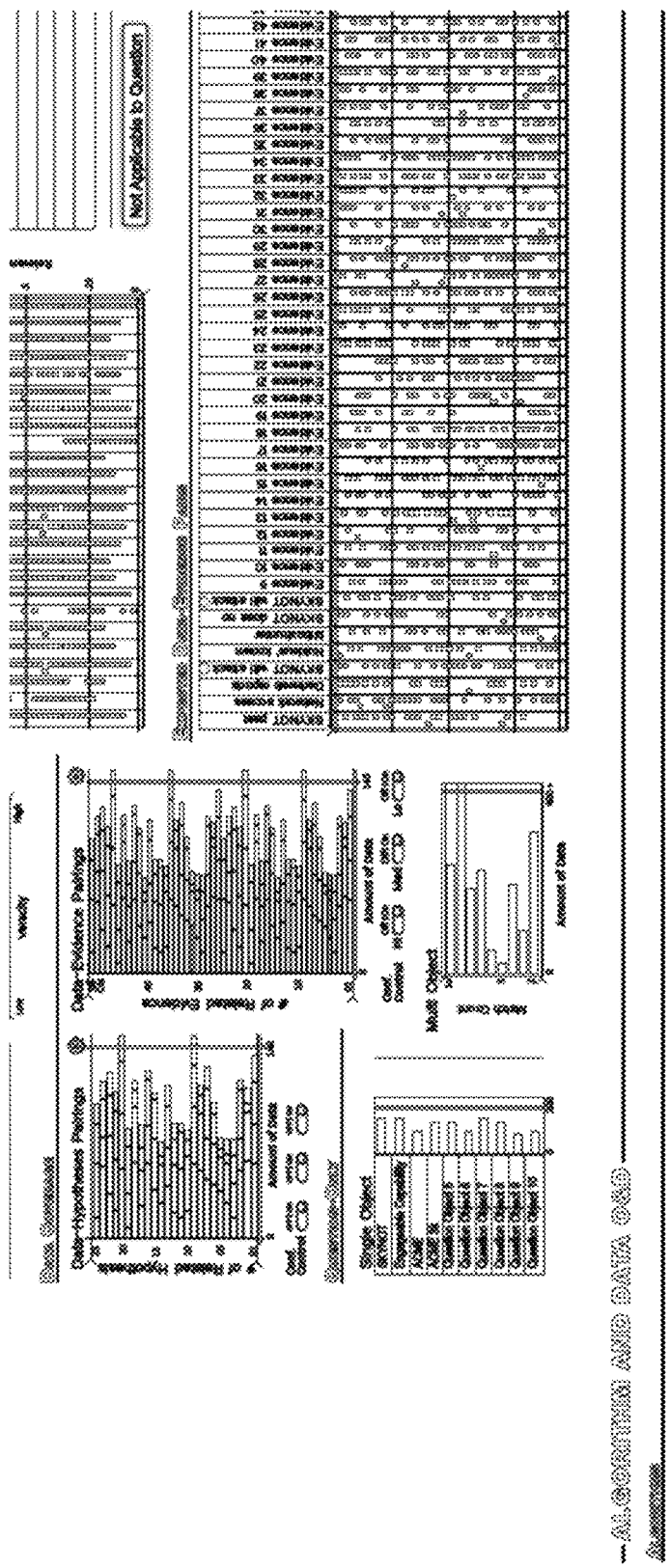
Figure 4E:
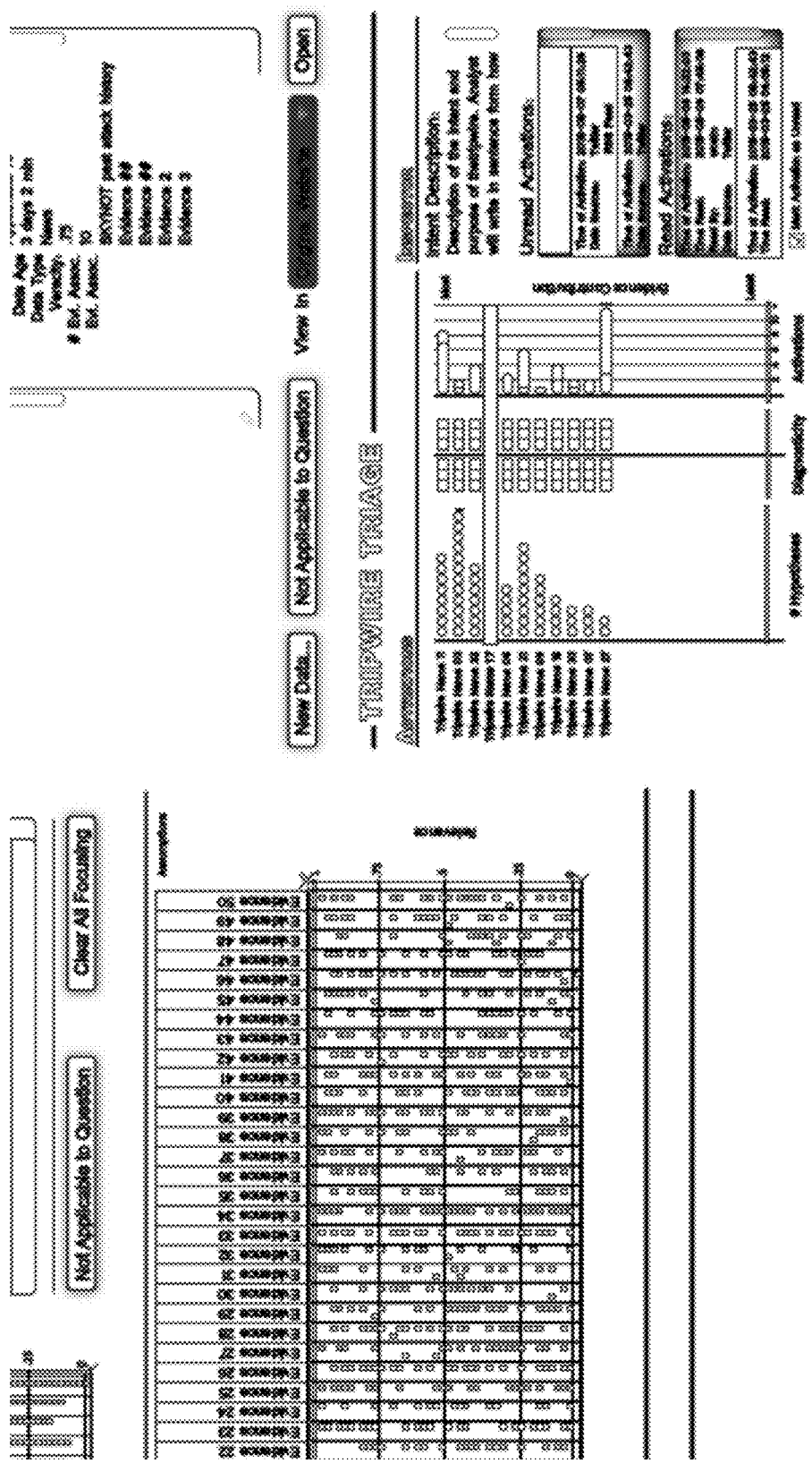

FIGS. 4A-4E show various views of an output 461 of the triage module 107 in accordance with certain example embodiments. Specifically, referring to FIGS. 1-4E, FIG. 4A shows a framework of the entire output 461 of the triage module 107. FIG. 4B shows a close-up view of the upper left quadrant of the output 461 of FIG. 4A. FIG. 4C shows a close-up view of the upper right quadrant of the output 461 of FIG. 4A. FIG. 4D shows a close-up view of the lower left quadrant of the output 461 of FIG. 4A. FIG. 4E shows a close-up view of the lower right quadrant of the output 461 of FIG. 4A.

Figure 5A:
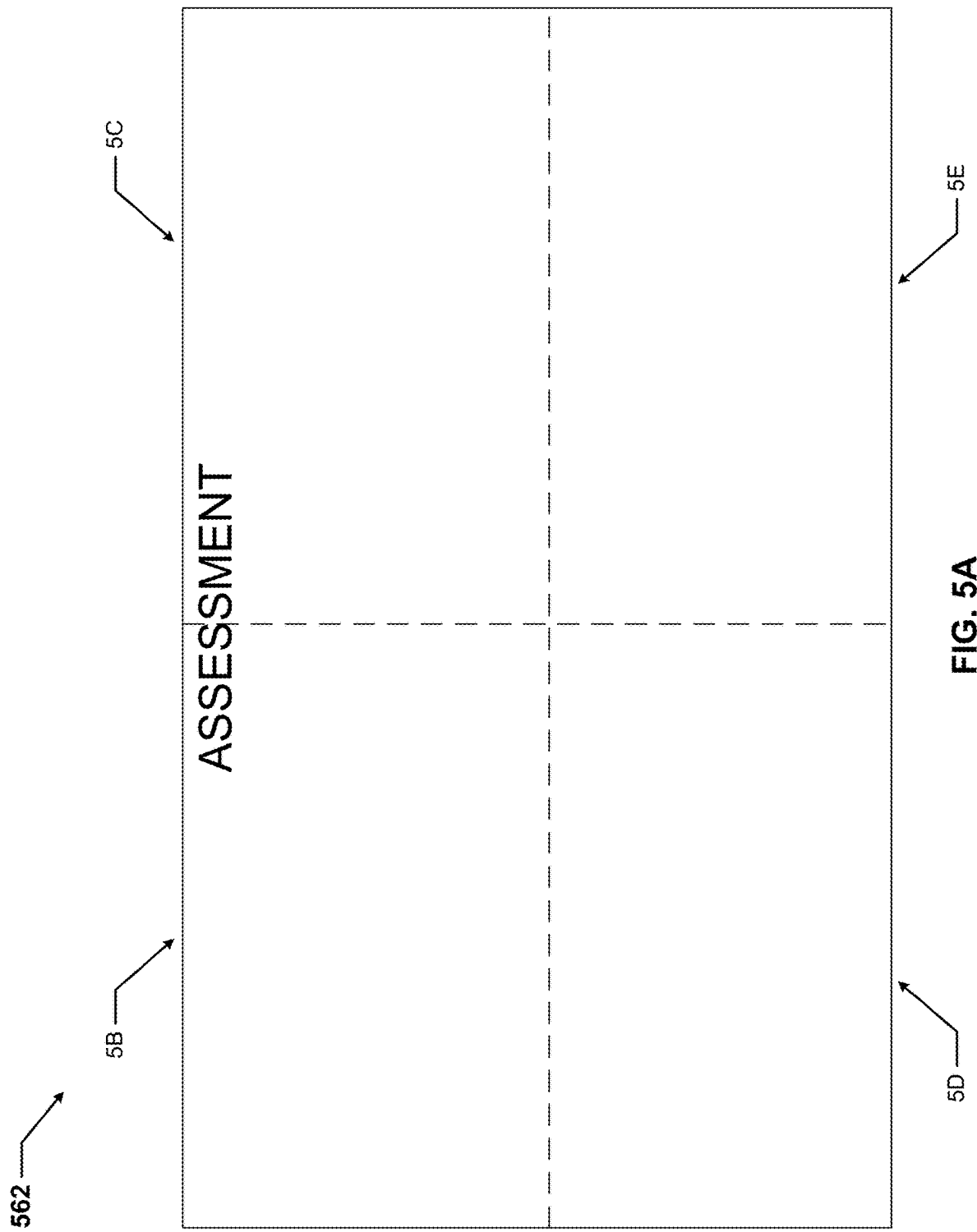
FIGS. 5A-5E show various views of an output of an assessment module in accordance with certain example embodiments.
Figure 5B:
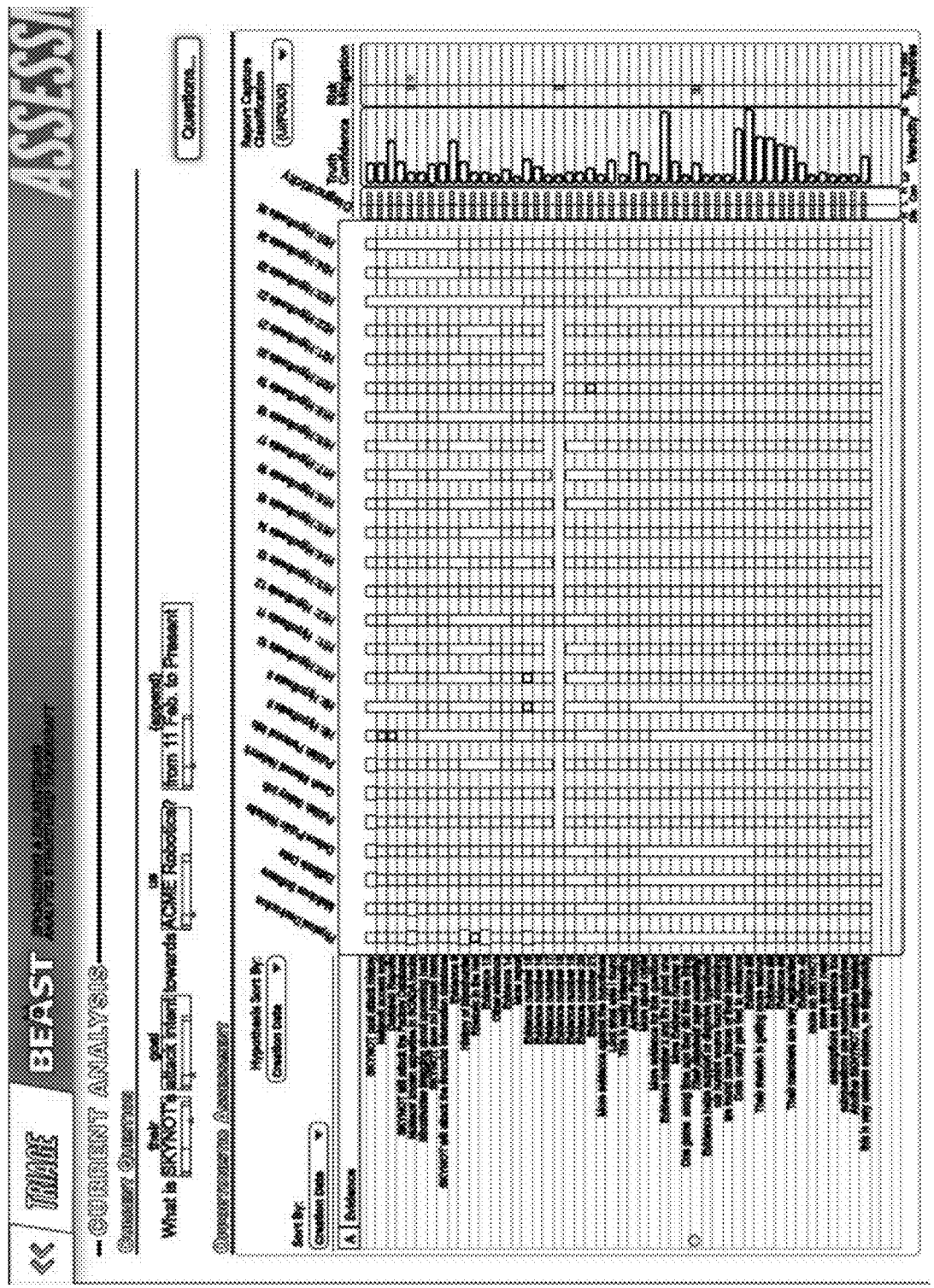
Figure 5C:
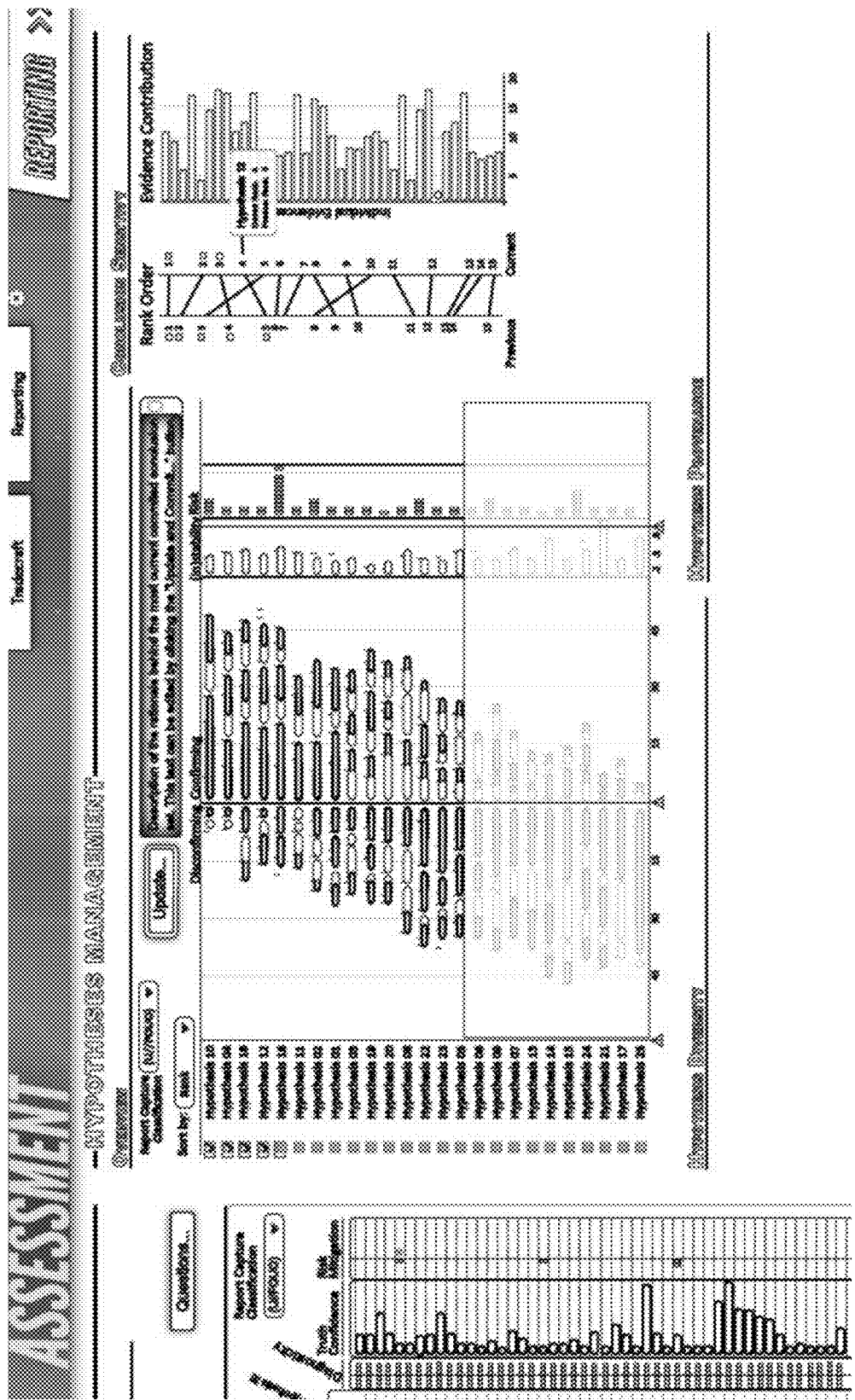
Figure 5D:
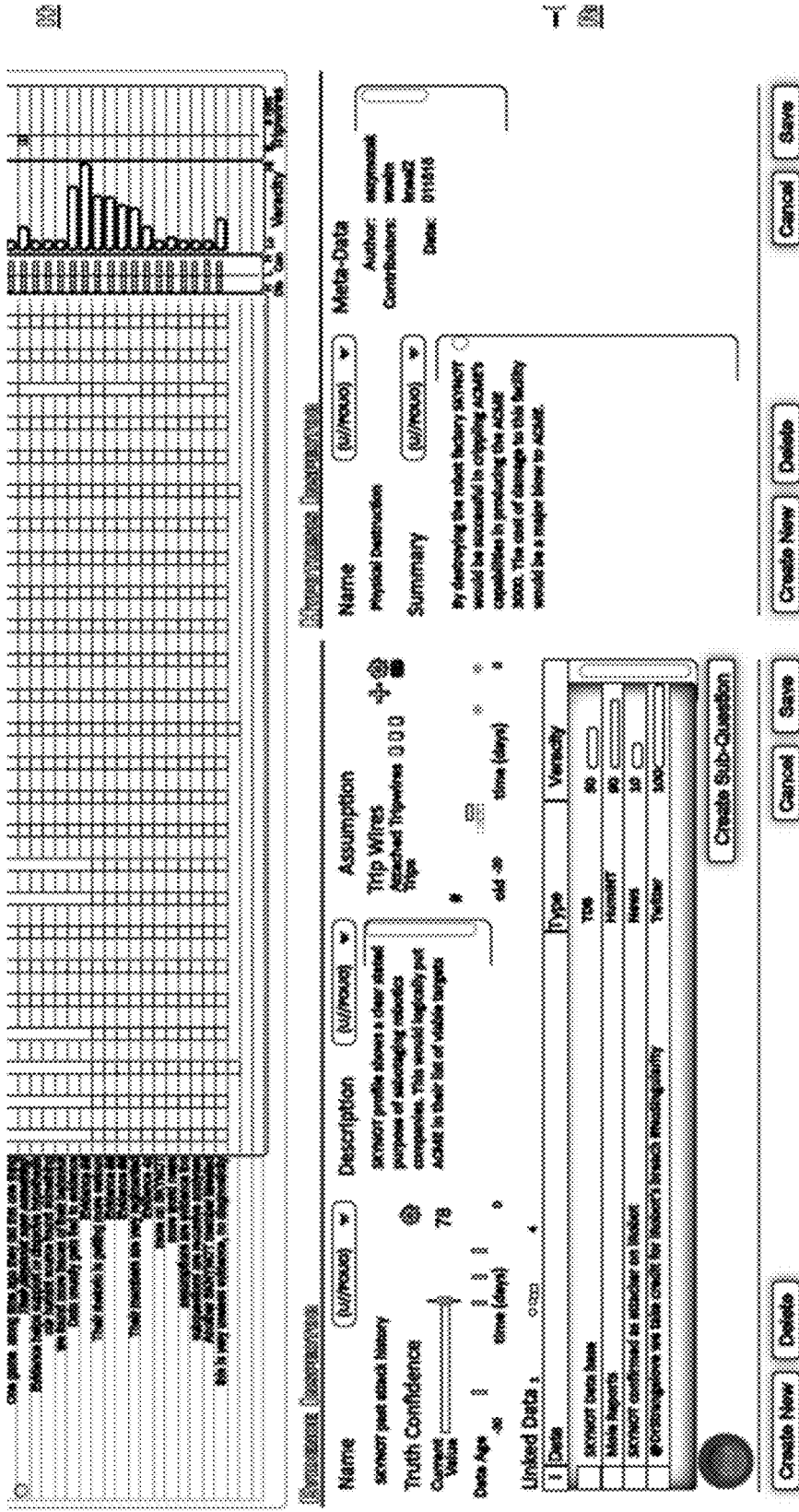
Figure 5E:
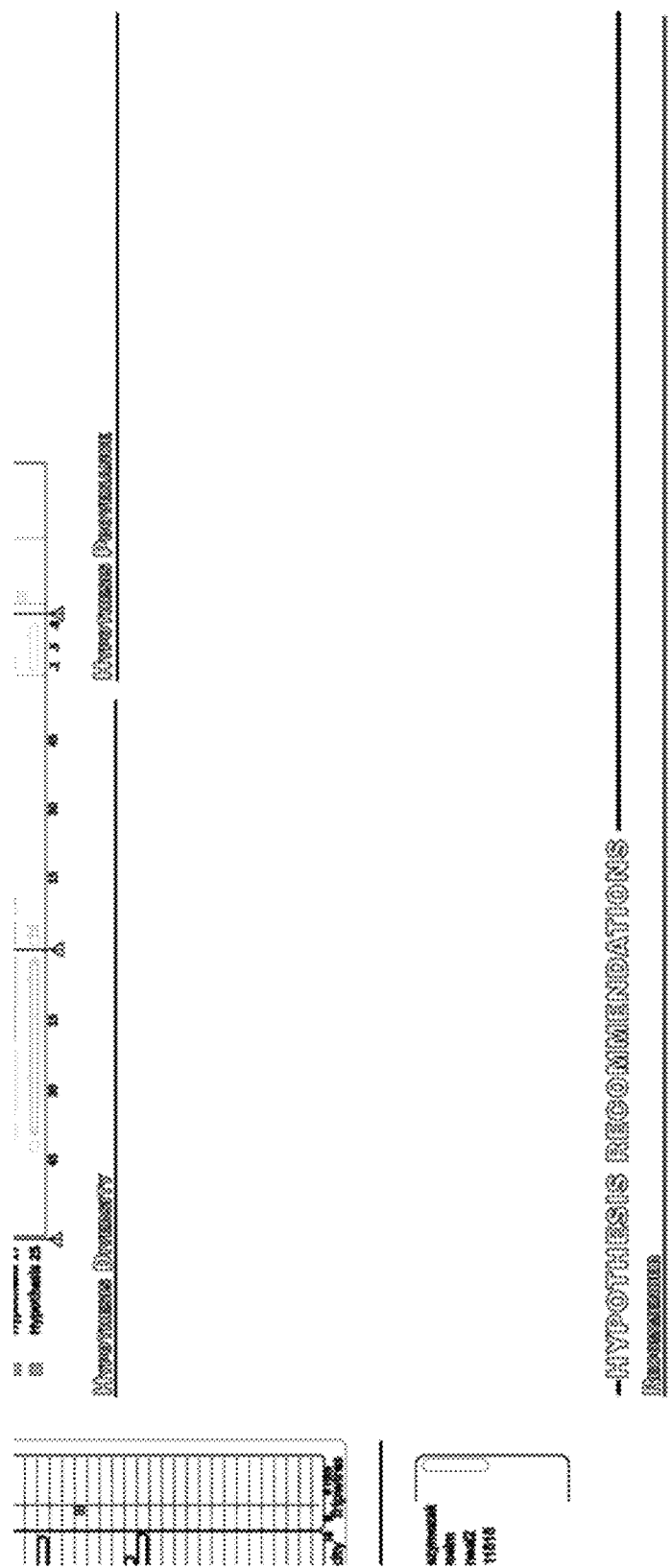

FIGS. 5A-5E show various views of an output 562 of the assessment module 111 in accordance with certain example embodiments. Specifically, referring to FIGS. 1-5E, FIG. 5A shows a framework of the entire output 562 of the assessment module 111. FIG. 5B shows a close-up view of the upper left quadrant of the output 562 of FIG. 5A. FIG. 5C shows a close-up view of the upper right quadrant of the output 562 of FIG. 5A. FIG. 5D shows a close-up view of the lower left quadrant of the output 562 of FIG. 5A. FIG. 5E shows a close-up view of the lower right quadrant of the output 562 of FIG. 5A.

Figure 6B:
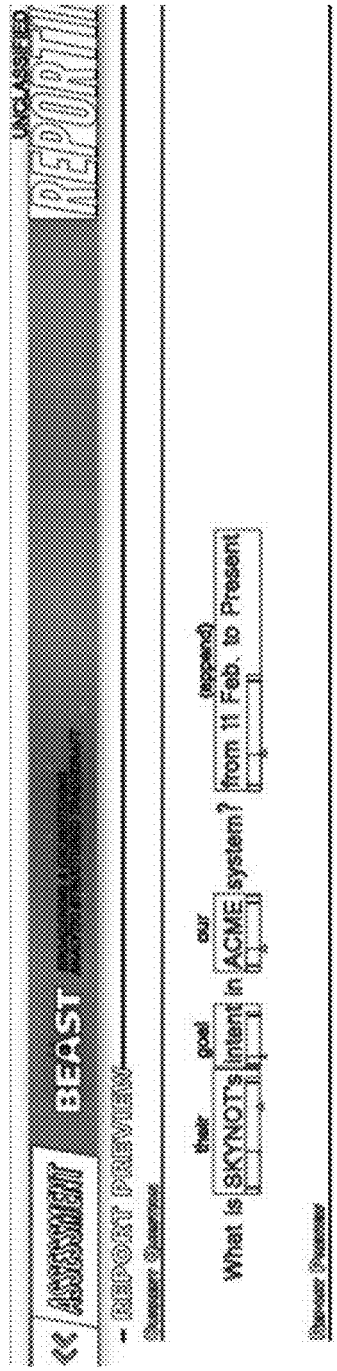
Figure 6B:
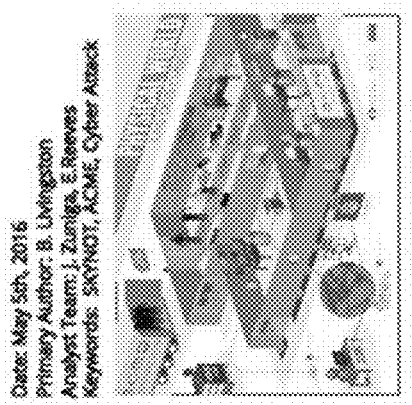
Figure 6C:
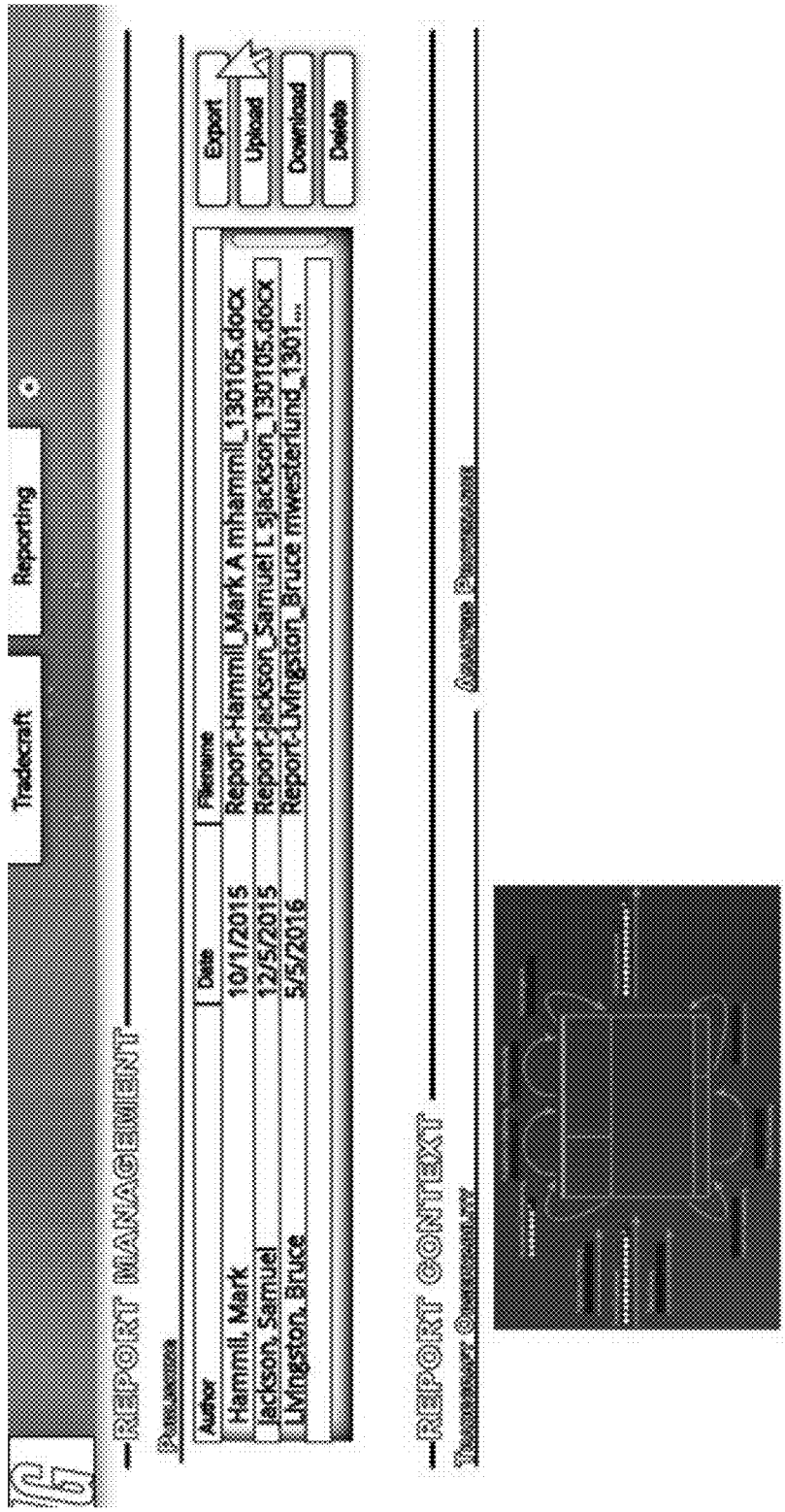
Figure 6D:
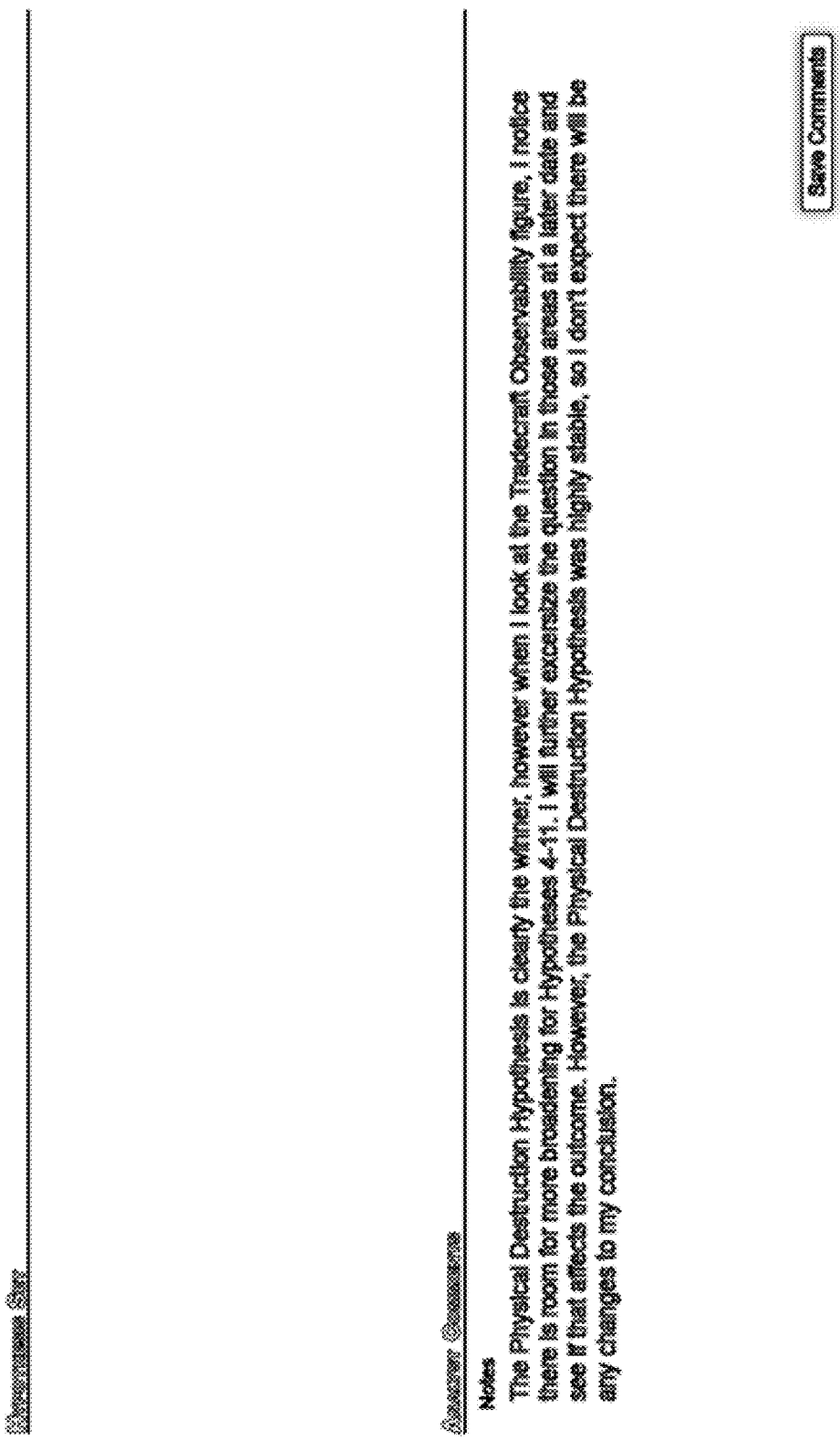

FIGS. 6A-6D show various views of an output 663 of the reporting module 109 in accordance with certain example embodiments. Specifically, referring to FIGS. 1-6D, FIG. 6A shows a framework of the entire output 663 of the reporting module 109. FIG. 6B shows a close-up view of the right half of the output 663 of FIG. 6A. FIG. 6C shows a close-up view of the upper right quadrant of the output 663 of FIG. 6A. FIG. 6D shows a close-up view of the lower right quadrant of the output 663 of FIG. 6A.

Figure 7A:
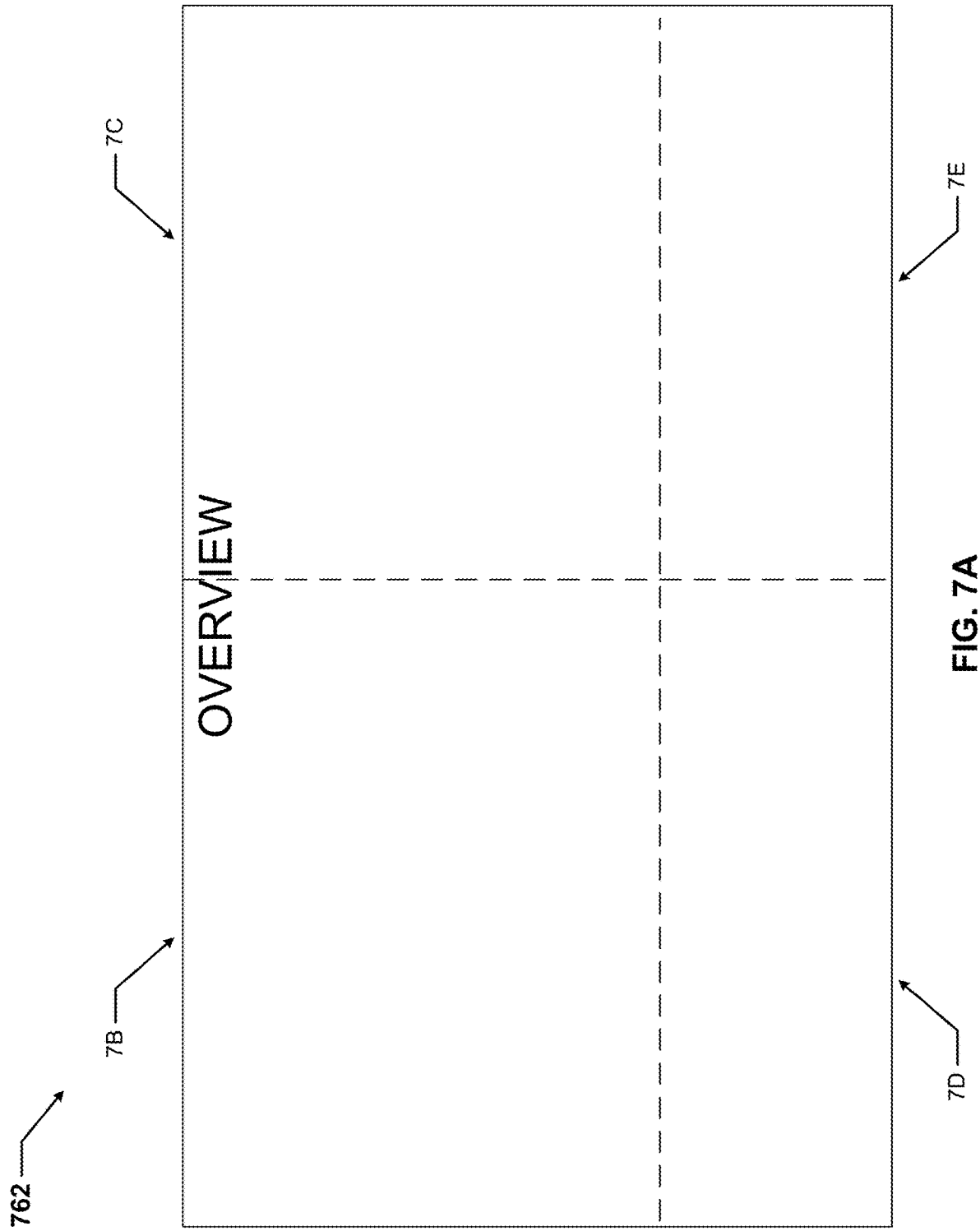
FIGS. 7A-7E show various views of an output of an analytics engine in accordance with certain example embodiments.
Figure 7B:
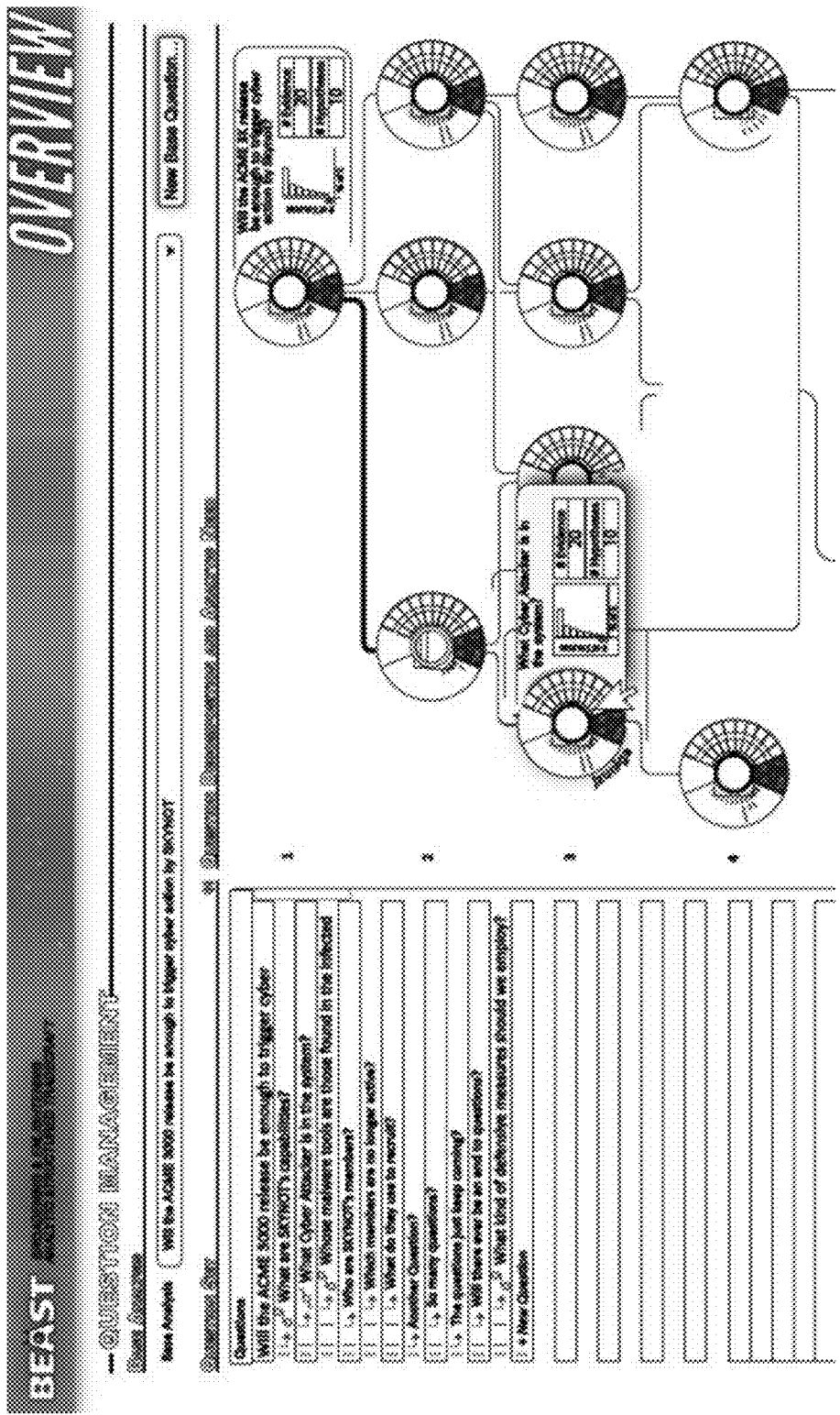
Figure 7C:
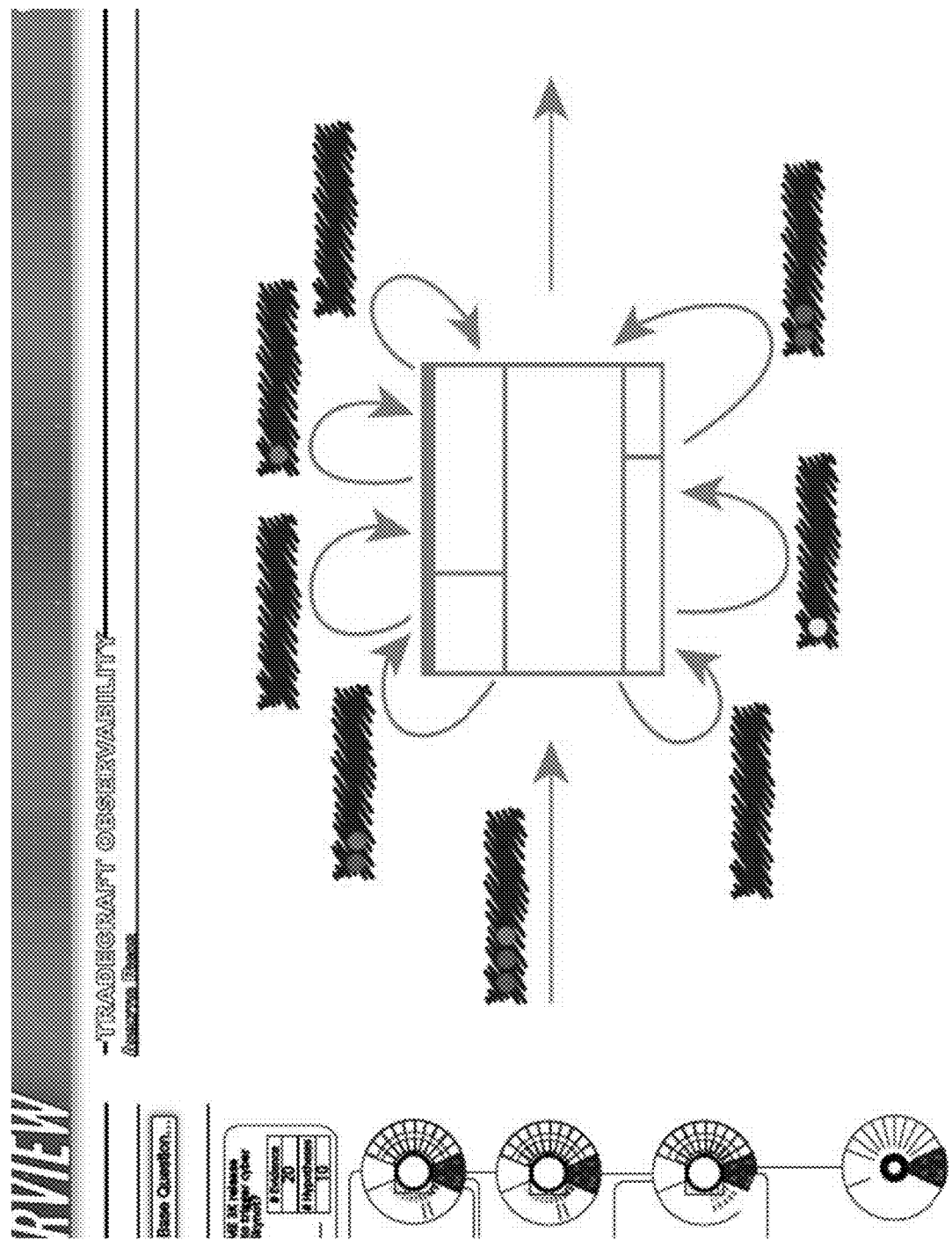
Figure 7D:
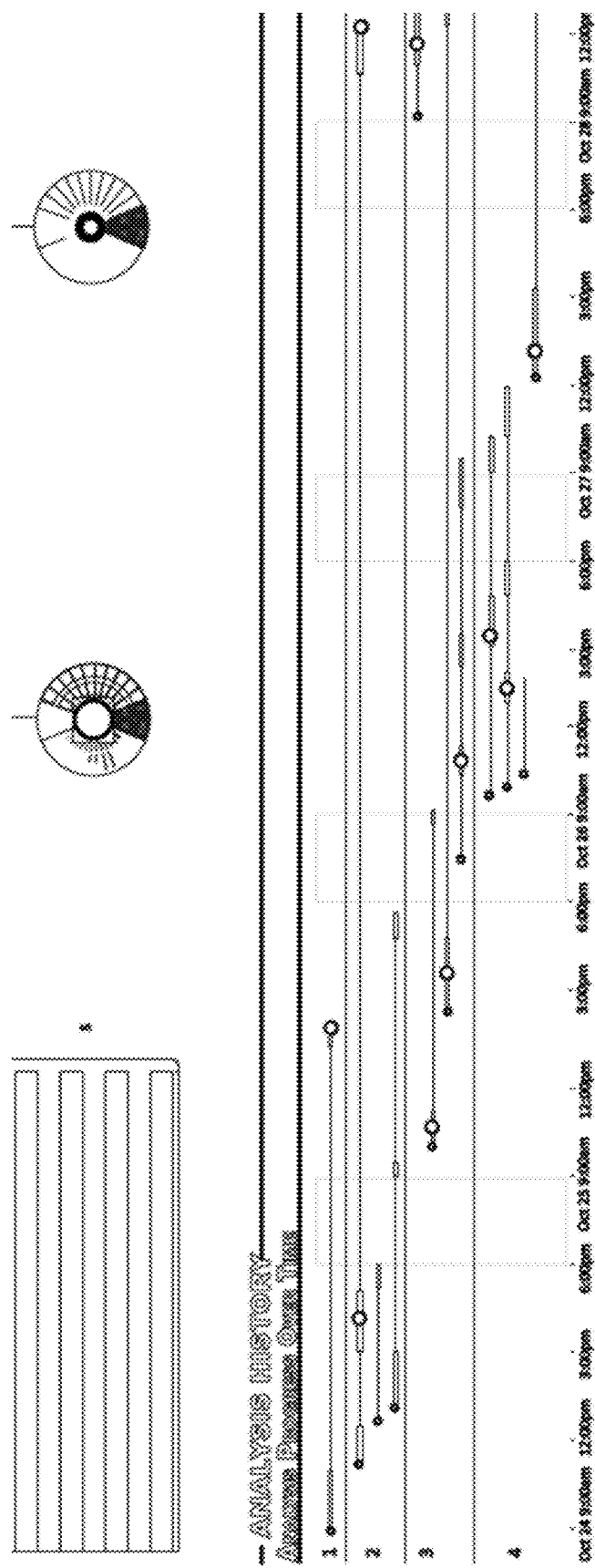
Figure 7E:
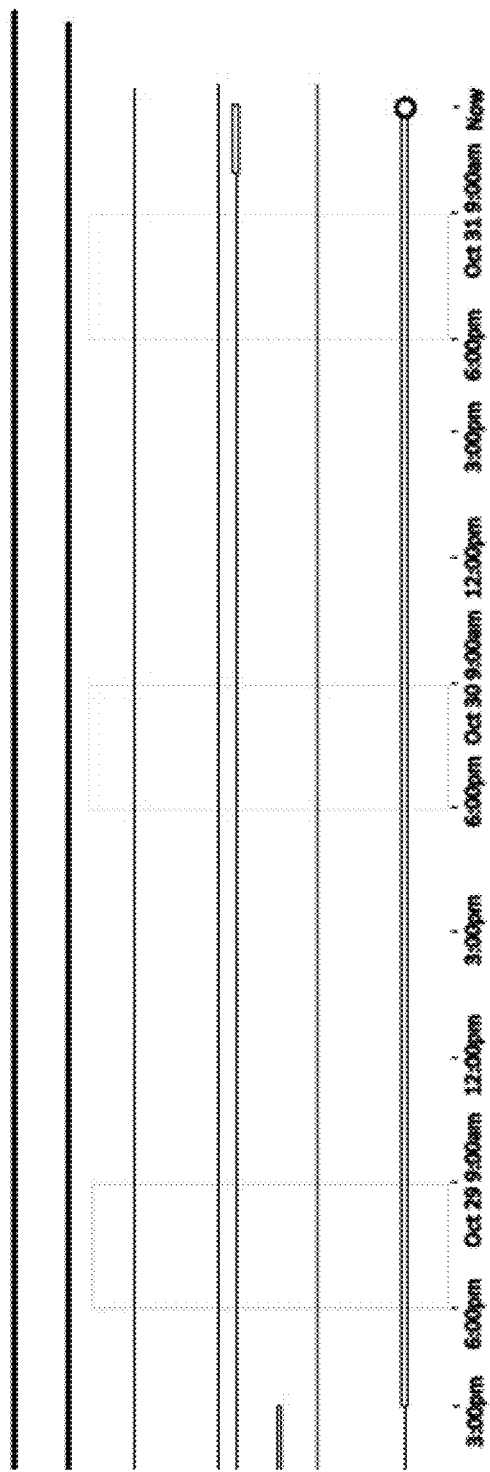

FIGS. 7A-7E show various views of an output 764 of the analytics engine 106 in accordance with certain example embodiments. Specifically, referring to FIGS. 1-7E, FIG. 7A shows a framework of the entire output 764 of the analytics engine 106. FIG. 7B shows a close-up view of the upper left quadrant of the output 764 of FIG. 7A. FIG. 7C shows a close-up view of the upper right quadrant of the output 764 of FIG. 7A. FIG. 7D shows a close-up view of the lower left quadrant of the output 764 of FIG. 7A. FIG. 7E shows a close-up view of the lower right quadrant of the output 764 of FIG. 7A. In certain example embodiments, the output 764 of the analytics engine 106 is used for self-awareness for a user 150 to understand, for example, the rigor of the analysis performed for a question and/or the current status of the team of users 150 across the network 390 of questions.

FIG. 8 shows a flowchart for a method 835 for solving a problem in accordance with certain example embodiments. While the various steps in these flowcharts are presented and described sequentially, one of ordinary skill in the art will appreciate that some or all of the steps can be executed in different orders, combined or omitted, and some or all of the steps can be executed in parallel depending upon the example embodiment. In fact, in certain example embodiments, the analytics system 140 is designed to perform multiple steps of method 835 concurrently and iteratively, to avoid the impractical linear progression of the current art. Further, in one or more of the example embodiments, one or more of the steps described below can be omitted, repeated, and/or performed in a different order. For example, the process of solving a problem can be a continuous process, and so the START and END steps shown in FIG. 8 can merely denote the start and end of a particular series of steps within a continuous process.

In addition, a person of ordinary skill in the art will appreciate that additional steps not shown in FIG. 8 can be included in performing these methods in certain example embodiments. Accordingly, the specific arrangement of steps should not be construed as limiting the scope. In addition, a particular computing device, as described, for example, in FIG. 2 above, is used to perform one or more of the steps for the methods described below in certain example embodiments. For the methods described below, unless specifically stated otherwise, a description of the analytics system 140 performing certain functions can be applied to the analytics engine 106 of the analytics system 140.

Referring to FIGS. 1-8, the example method 835 of FIG. 8 begins at the START step and proceeds to step 836, where an inquiry is received. The inquiry can be received by the analytics system 140 from a user 150. In step 837, a network 390 of questions 391 is created. In certain example embodiments, the network 390 of questions 391 is created by one or more users 150 and received by the analytics system 140. In some cases, the analytics system 140 (or a component thereof, such as the analytics engine 106) can assist in screening and/or generating one or more of the questions 391. In step 838, one of the questions 391 is received. In certain example embodiments, the question is received by the analytics system 140. The question 391 received can be based on a selection of the question 391 by a user 150. Alternatively, the selection of the question 391 can be made by the analytics engine 106 or some other component of the analytics application 104. In some cases, the question 391 that is received is at the lowest level 394 (or the lowest level available at the time of the selection) of the network 390.

In certain example embodiments, the question that is received is tested by various components (e.g., the analytics engine 106, the natural language module 131, the query module 125) of the analytics system 140 to determine whether the language in the question is complete and unambiguous. If at least some of the language in the question is incomplete and/or ambiguous, then those components of the analytics system 140, in some cases based in interaction with a user 150, resolve those problems until the language in the question is complete and unambiguous. Similarly, the analytics system 140 can test all of the questions in the network to ensure that they are robust.

In step 839, assumptions related to the selected question 391 are received from one or more users 150. In addition to assumptions, other information (e.g., hypotheses, sub-questions to the question 391) can also be received from a user 150. All of this information can be received by the analytics system 140. In some cases, a component (e.g., the query module 125, the analytics engine 106) of the analytics system 140 can suggest an assumption or other information for approval by the user 150.

In step 841, natural language search terms are generated based on the question 391, assumptions, and other related information received from the one or more users 150. The natural language module 131 can be used with the query module 125 to provide alternative language options so that the broadest scope of results (data) can be sent back to the query module 125 from the data sources 102 in response to those queries. By using the alternative language in the queries, the resulting data is not limited in scope, offering a user 150 a more complete set of data with which to work and evaluate.

In optional step 842, clarification of one or more search terms can be received from a user 150. The clarifications can be received by the query module 125 and/or the natural language module 131 of the analytics system 140. A clarification can be initiated by a user 150 based on the natural language search terms generated by the natural language module 131. In addition, or in the alternative, a clarification can be initiated by the analytics engine 106 (or other component of the analytics system 140) so that the natural language module 131 can generate natural language that will lead to receiving optimal data to consider the question 391 at issue.

In step 843, data sources 102 are queried for data based on the natural language search terms. These queries can be sent by the query module 125. The queries can be broadcast to all known data sources 102. Alternatively, the queries can be sent to a selection of data sources 102. In such a case, the selected data sources 102 can be chosen based on any of a number of criteria, including but not limited to the subject matter of the question 391, the subject matter of the query, historical data received from certain data sources 102, and the reliability of the data previously provided by data sources 102. In other words, the query module 125 (or other component of the analytics system 140) can expedite the process by avoiding sending the query to data sources 102 that are known not to have relevant or reliable data relative to the question 391.

In step 844, the data is received from the data sources 102. The data can be received by the query module 125 or some other component (e.g., the triage module 107) of the analytics system 140. Once the data is received, in step 845, the data is evaluated. The data can be evaluated by the triage module 107, sometimes in conjunction with one or more other components (e.g., the relevance module 121) of the analytics system 140. Evaluating the data can include, but is not limited to, determining how old the data is, determining the reputation of the data source 102 providing the data, determining how much similar data is received from other data sources 102, and determining (using the relevance module 121) the relevance of the data relative to the question 391 at issue. The data can also be evaluated by pairing the data with the different hypotheses, assumptions, and other information provided by the user 150.

In step 846, the data is presented after being evaluated. The data can be presented by the triage module 107 to one or more users 150. The data can be presented on a display, such as a touchscreen, a television, a computer monitor, or a screen of a smart device, for each user 150. The data that is presented can be organized in a manner consistent with the evaluation. For example, the triage module 107 can create a graph showing data paired with the various hypotheses. As another example, the triage module 107 can create a graph showing veracity and age of the data. The data that is presented can also be filtered or otherwise manipulated by a user 150 to help the user 150 better evaluate the data.

In some cases, multiple users 150 can use the triage module 107 at the same time, and so changes made by one user 150 can be reflected on the displays of the other users 150 in real time. In this way, for large projects with a complicated network of questions and a large number of simultaneous users 150, and with constant querying of multiple data sources 102 by the query module 125, the triage module 107 (as well as the other components of the analytics application 104) can operate in a coordinated, multifaceted environment in real time.

In step 847, a determination is made as to whether input is received from a user 150 to organize the data. Such input can be a user 150 manipulating a user interface (e.g., a touchscreen, a cursor directed by a mouse) on which the data is presented. Also, such input can be for a particular area of the overall display on which the data is presented. Examples of an input can include, but are not limited to, specifying a date range, specifying a level of veracity, specifying certain tripwires, and selecting one or more controls that allow selected data to be brought forward or emphasized relative to other data in a dataset. In other words, unwanted data is not removed by these inputs by a user 150. Instead, such data is not given as much emphasis or importance, but is still retained in a dataset. If input is received from a user 150 to organize the data, then the process proceeds to step 848. If no input is received from a user 150 to organize the data, then the process proceeds to step 851.

In step 848, data is presented based on the input received from the user 150. The data is presented by the triage module 107. The corresponding adjustments to the data can be made by the triage module 107 in real time relative to when the input is received from the user 150. If one area of the display of data is directly affected by a user input, and another area of the display is indirectly affected by the input, then the triage module 107 can adjust, in real time, all areas of the display and data that are directly or indirectly affected by the input. Again, some of the input provided by a user 150 are meant to bring forward certain data in a dataset rather than filter out "unwanted" data. When step 848 is complete, the process proceeds to step 851.

In step 851, one or more selections of data are received from a user 150 as evidence. Such selections can be received by the triage module 107. When data is selected by the user 150, the data becomes categorized as evidence, which is the meaning taken from the data by a user 150. A piece of evidence can have one or multiple supporting pieces of data. Alternatively, if evidence designated by a user 150 has no supporting data, then it is labeled as an assumption until supporting data can be linked, converting the assumption to evidence. Evidence is used to support and/or refute a hypothesis. When data is selected as evidence, the user 150 and/or the triage module 107 can assign the evidence to one or more objects (e.g., hypothesis, assumption, tripwire). All of the metadata and metacontent associated with the data remains with the evidence that the data supports.

In step 852, one or more selections of evidence are received from a user 150 as being applied to one or more hypotheses. Each piece of evidence that is applied to a hypothesis can be used to support or refute the hypothesis. Such selections can be received by the triage module 107 or some other component of the analytics application 104. When evidence is applied to a hypothesis, the evidence (including its metadata and metacontent) remains linked to the hypothesis.

In step 853, a determination is made as to whether the question 391 has been answered using a selected hypothesis. The determination can be made by one or more of the users 150 with the assistance of the assessment module 111. In some cases, the hypotheses manager 113 can be used to provide an overview of the assessment, helping a user 150 decide if the selected hypothesis is the answer to the question at issue. When a hypothesis answers the question 391, the hypothesis becomes evidence for other linked questions in the network 390 of questions. If the question 391 is answered, then the process proceeds to step 854. If the question 391 is not answered, then the process reverts to step 843.

In step 854, a report is prepared to include the evidence used to answer the question 391. The report can be generated by the reporting module 109. Similarly, the report can be distributed to one or more users 150 and/or the network manager 180. For example, users 150 working on other questions 391 in the network 390 can receive the report, which can help the other users 150 answer the questions for which they are responsible. The report can take on any of a number of forms, have any of a number of parts, and be distributed in any of a number of media (e.g., paper, electronically).

In step 855, a determination is made as to whether there are any questions 391 remaining in the network 390. This determination can be made by the assessment module 111 and/or some other component (e.g., the analytics engine 106) of the analytics system 140. Remaining questions 391 can be at the current level 394 or at any other level in the network 390. If there is a remaining question 391 in the network 390, then the process reverts to step 838. If there are no more questions 391 remaining in the network 390, then the process proceeds to step 856, where the selection is for a new question 391 in the network 390.

In step 856, an overall report solving the inquiry 392 is generated. The overall report can be generated by the reporting module 109. Similarly, the report can be distributed to one or more users 150 and/or the network manager 180. For example, all users 150 working on the inquiry 392 can receive the overall report. The overall report can take on any of a number of forms, have any of a number of parts, and be distributed in any of a number of media (e.g., paper, electronically). The overall report can be based on each of the individual reports generated for each of the questions 391 in the network. Overall, reports can be discrete (e.g., presented only after a question is answered) or continuously displayed and updated in real time. Particular reports generated and presented can be done by default, by request of a user 150, or based on some other factor. After step 856 is completed, the method 835 of FIG. 8 ends at the END step.

It should be noted that the example system described herein is designed for multiple users 150 to work on a single inquiry 392, or even a single question 391 for the single inquiry 392, at one time. Also, many of the steps described in the method 835 of FIG. 8 can be iterative, so that they can be repeated before moving on to another step or while another step is being performed. Also, whether multiple users 150 or a single user 150 is working on a single question at one time, multiple steps in the method 835 can be performed simultaneously.

Example embodiments can be used to solve problems by continually interacting with a user to receive input along various stages of the analysis to solve a problem. Example embodiments can be used to solve simple or extremely complex problems. Example embodiments can be used across a number of disciplines and can be employed with multiple users simultaneously. Example embodiments are designed to decompose an initial inquiry to eliminate user bias while still relying on the user to clarify ambiguities and incrementally answer questions that ultimately build to solving the main inquiry.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. An analytics system comprising:
a display on which a plurality of images are shown; and
an analytics application communicably coupled to the display, wherein the analytics application:
receives an inquiry from a user and generates a hierarchical network of questions that support an answer to the inquiry;
receives a selected question from among the hierarchical network of questions by the user using the display, wherein the selected question is selected from among the hierarchical network of questions;
receives assumptions and hypotheses from the user using the display, wherein the assumptions and hypotheses are specific to the selected question;
generates, by a query module, a plurality of queries using a natural language module, wherein the natural language module incorporates natural language into the plurality of queries, wherein the plurality of queries are based on the selected question, the assumptions, and the hypotheses;
sends the plurality of queries to a plurality of data sources;
receives data from the plurality of data sources in response to the plurality of queries;
evaluates the data to generate evaluated data, wherein evaluating the data includes evaluating a tripwire linked to the assumptions by a tripwire module to detect user bias in the assumptions;
presents, to the user using a triage module on the display, the evaluated data, wherein the evaluated data is organized by age, veracity, and relevance to the hypotheses;
receives, from the user by the triage module on the display, a first selection of at least one data item of the evaluated data;
converts, by the triage module, the at least one data item into evidence;
receives a second selection of the evidence applied to a hypothesis among the hypotheses;
evaluates, by an assessment module, the hypothesis against the question;
presents, by the assessment module on the display, an assessment of the hypothesis against the question based on an analysis by a hypotheses manager; and
receives, from the user on the display, confirmation that the hypothesis answers the question.

2. The analytics system of claim 1, wherein the analytics application further:
generates, using a reporting module, at least one report explaining the answer, wherein the at least one report comprises the evidence supporting the hypothesis and the hypothesis used to answer the question.

3. The analytics system of claim 1, wherein the hierarchical network of questions is created and arranged by the user.

4. The analytics system of claim 1, wherein the hypothesis used to answer the selected question is used by the user to help answer another question in the hierarchical network of questions.

5. The analytics system of claim 4, wherein the analytics application further:
presents, on the display, an overview of a status for answering the hierarchical network of questions.

6. The analytics system of claim 1, wherein the query module evaluates contents of the query and selects the data sources from a pool of data sources based on the contents.

7. The analytics system of claim 1, wherein the query module evaluates contents of the query and selects the data sources based on a reliability of previous data supplied by the data sources.

8. The analytics system of claim 1, wherein the query module evaluates the data sources submitting data and notifies the user on the display whether particular data items are from reliable data sources.

9. The analytics system of claim 1, wherein the triage module allows the user, using the display, to manipulate the evaluated data to assist the user in selecting the at least one data item.

10. The analytics system of claim 1, wherein the triage module evaluates the data, in part, by determining an age of the data.

11. The analytics system of claim 1, wherein the triage module presents the evaluated data by pairing the evaluated data with at least one selected from a group consisting of the assumptions and the hypotheses.

12. The analytics system of claim 1, wherein the evaluated data is among a plurality of evaluated data, and wherein the evidence is among a plurality of evidence used to arrive at the answer to the question.

13. The analytics system of claim 1, wherein the analytics application and its components perform in real time.

14. The analytics system of claim 1, wherein the analytics application evaluates the data using a relevance module to determine a relevance of the data relative to the query.

15. A system for solving a problem by offsetting cognitive bias, the system comprising:
- a plurality of data sources;
- at least one user;
- a display; and
- an analytics application communicably coupled to the plurality of data sources and the at least one user, wherein the analytics application:
  - receives an inquiry from a user and generates a hierarchical network of questions that support an answer to the inquiry;
  - receives a selected question from the at least one user using the display, wherein the selected question is among a hierarchical network of questions;
  - receives assumptions and hypotheses from the at least one user using the display, wherein the assumptions and hypotheses are specific to the selected question;
  - generates, by a query module, a plurality of queries using a natural language module, wherein the natural language module incorporates natural language into the plurality of queries, wherein the plurality of queries are based on the selected question, the assumptions, and the hypotheses;
  - sends the plurality of queries to the plurality of data sources;
  - receives data from the plurality of data sources in response to the plurality of queries;
  - evaluates the data to generate evaluated data, wherein evaluating the data includes evaluating a tripwire linked to the assumptions by a tripwire module to detect user bias in the assumptions;
  - presents, to the at least one user using a triage module on the display, the evaluated data, wherein the evaluated data is organized by age, veracity, and relevance to the hypotheses;
  - receives, from the at least one user by the triage module on the display, a first selection of at least one data item of the evaluated data;
  - converts, by the triage module, the at least one data item into evidence;
  - receives a second selection of the evidence applied to a hypothesis among the hypotheses;
  - evaluates, by an assessment module, the hypothesis against the question;
  - presents, by the assessment module on the display, an assessment of the hypothesis against the question based on an analysis by a hypotheses manager; and
  - receives, from the at least one user on the display, confirmation that the hypothesis answers the question.

16. The system of claim 15, wherein at least one data source of the plurality of data sources is secure, wherein the query sent by the query module to the at least one data source comprises credentials to access the at least one data source.

17. The system of claim 15, wherein at least one user is among a plurality of users working on the question simultaneously.

18. A non-transitory computer-readable medium comprising instructions that, when executed by a hardware processor, perform a method for solving a problem, the method comprising:
- receiving an inquiry from a user and generating a hierarchical network of questions that support an answer to the inquiry;
- receiving a selected question from the user using a display, wherein the question is among the hierarchical network of questions;
- receiving assumptions and hypotheses from the user using the display, wherein the assumptions and hypotheses are specific to the selected question;
- generating, by a query module, a plurality of queries using a natural language module, wherein the natural language module incorporates natural language into the plurality of queries, wherein the plurality of queries is based on the selected question, the assumptions, and the hypotheses;
- sending the plurality of queries to a plurality of data sources;
- receiving data from the plurality of data sources in response to the plurality of queries;
- evaluating the data to generate evaluated data, wherein evaluating the data includes evaluating a tripwire linked to the assumptions by a tripwire module to detect user bias in the assumptions;
- presenting, to the user using a triage module on the display, the evaluated data, wherein the evaluated data is organized by age, veracity, and relevance to the hypotheses;
- receiving, from the user by the triage module on the display, a first selection of at least one data item of the evaluated data;
- converting, by the triage module, the at least one data item into evidence;
- receiving a second selection of the evidence applied to a hypothesis among the hypotheses;
- evaluating, by an assessment module, the hypothesis against the question;
- presenting, by the assessment module on the display, an assessment of the hypothesis against the question; and
- receiving, from the user on the display, confirmation that the hypothesis answers the question.

19. The non-transitory computer-readable medium of claim 18, wherein at least one other question of the plurality of questions is generated by an analytics engine.

20. The non-transitory computer-readable medium of claim 19, wherein the analytics engine further generates at least some of the hypotheses.

* * * * *